US011414128B1

(12) United States Patent
Cui et al.

(10) Patent No.: US 11,414,128 B1
(45) Date of Patent: Aug. 16, 2022

(54) MULTIPLE MANEUVERING SYSTEMS FOR VARIOUS APPLICATIONS

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 17/397,945

(22) Filed: Aug. 9, 2021

(51) Int. Cl.
*B62D 7/02* (2006.01)
*B62D 7/04* (2006.01)

(52) U.S. Cl.
CPC .............. *B62D 7/026* (2013.01); *B62D 7/04* (2013.01)

(58) Field of Classification Search
CPC .................................. B62D 7/02; B62D 7/026
See application file for complete search history.

(56) References Cited

U.S. PATENT DOCUMENTS

| | | | | |
|---|---|---|---|---|
| 3,016,966 A * | 1/1962 | Hansen | ................ | B62D 61/00 180/21 |
| 3,198,541 A | 8/1965 | Christenson et al. | | |
| 3,800,899 A * | 4/1974 | Thwaites | ........... | B62D 49/0621 280/100 |
| 3,806,986 A | 4/1974 | Wentworth | | |
| 3,825,087 A * | 7/1974 | Wilson | ................ | A01B 51/023 180/242 |
| 4,257,619 A | 3/1981 | Fisher | | |
| 5,752,710 A * | 5/1998 | Roberts | ................ | A61G 5/046 180/408 |
| 6,540,039 B1 | 4/2003 | Yu et al. | | |
| 9,228,649 B1 | 1/2016 | Cui et al. | | |
| 9,789,902 B1 | 10/2017 | Cui et al. | | |
| 10,800,030 B1 * | 10/2020 | Cui | .......................... | B62B 3/00 |
| 11,015,664 B1 | 5/2021 | Cui et al. | | |
| 2004/0227316 A1 | 11/2004 | Drummond | | |
| 2005/0236208 A1 | 10/2005 | Runkies et al. | | |
| 2015/0360707 A1 * | 12/2015 | Gullino | .................... | B62D 1/14 280/659 |
| 2017/0065355 A1 * | 3/2017 | Ross | ..................... | A61B 34/30 |

FOREIGN PATENT DOCUMENTS

CA 2906857 A1 4/2017
CN 210101812 U 2/2020

* cited by examiner

*Primary Examiner* — James A English
(74) *Attorney, Agent, or Firm* — Nath, Goldberg & Meyer; Richard C. Litman

(57) ABSTRACT

The multiple maneuvering systems for various applications includes several embodiments of wheeled, multiple maneuvering systems including multiple parallel maneuvering systems (MPMS). Each MPMS includes two or more parallel maneuvering units (PMUs) attached to one another by a connecting structure. Each PMU includes two or more powered or non-powered wheels, with the wheels being maintained parallel to one another by a steering mechanism. The steering mechanism may include gears, belt and pulley, chain and sprocket, or a rigid linkage. The connecting structure may be rigid, linearly adjustable, rotatable adjustable or both linearly and rotatable adjustable. The adjustable connecting structures allow for relative movement between the PMUs, while maintaining a load support surface(s) of the MPMSs.

20 Claims, 25 Drawing Sheets

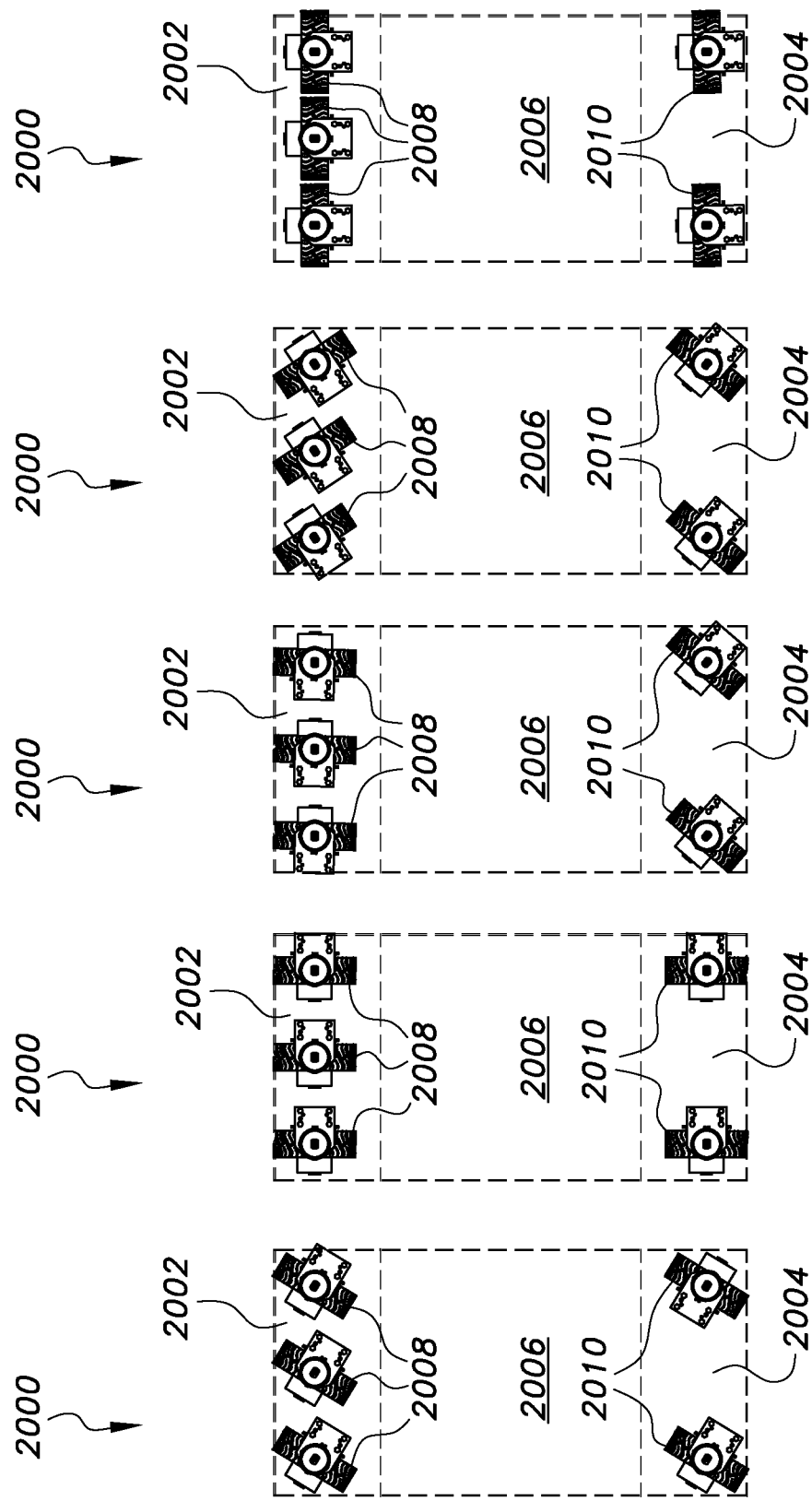

MULTIPLE MANEUVERING SYSTEMS FOR VARIOUS APPLICATIONS

BACKGROUND

1. Field

The disclosure of the present patent application relates to wheeled systems, and particularly to multiple maneuvering systems for various applications.

2. Description of the Related Art

In general, wheeled systems or supporting and moving various types of loads are known. These systems, however, have many limitations. They are unable to reconfigure their structures to provide adjustable load support surfaces or additional lateral support. In addition, their steering systems are limited to single steering manipulators, thereby limiting their ability to navigate close areas such as aisles in stores, warehouses, factories, and other locations.

Thus, multiple maneuvering systems for various applications solving the aforementioned problems is desired.

SUMMARY

The multiple maneuvering systems for various applications includes several embodiments of wheeled, multiple maneuvering systems including multiple parallel maneuvering systems (MPMS). Each MPMS includes two or more parallel maneuvering units (PMUs) attached to one another by a connecting structure. Each PMU includes two or more powered or non-powered wheels, with the wheels being maintained parallel to one another by an independent steering mechanism. The steering mechanism may include gears, belt and pulley, chain and sprocket, or a rigid linkage. The connecting structure may be rigid, linearly adjustable, rotatable adjustable or both linearly and rotatable adjustable. The adjustable connecting structures allow for relative movement between the PMUs, while maintaining a load support surface(s) of the MPMSs. In a first embodiment of the MPMS, two independent PMUs are rigidly connected to one another with each PMU having an independent steering actuator. In a second embodiment, the two independent PMUs are connected to one another by a telescoping structure to allow adjustment of the distance between the PMUs. As in the first embodiment, each PMU has an independent steering actuator. By driving the wheels of the PMUs in opposite directions, the telescoping structure can be extended and retracted. As the telescoping structure is extended, four safety arms with wheels are extended laterally to provide additional stability for the MPMS, while the safety arms are retracted as the telescoping structure is retracted. In a third embodiment, four PMUs are connected to one another by hinged linkages to form a rectangular configuration. As in the first two embodiments, each PMU has an independent steering actuator, so that the PMUs can be moved relative to each other to form the desired configuration.

A control actuator in the form of a dual joystick controller can be used to control an MPMS with two independent PMUs. Two of the controllers may be used to control an MPMS with four independent PMUs. Other types of controllers, both joystick-types and others may be used controlling the steering and driving of the wheels.

These and other features of the present subject matter will become readily apparent upon further review of the following specification.

BRIEF DESCRIPTION OF THE DRAWINGS

FIGS. 20A-20E are diagrams showing various steering configurations of a multiple maneuvering system for various applications having a two-wheel parallel maneuvering unit and a three-wheel parallel maneuvering unit.

Similar reference characters denote corresponding features consistently throughout the attached drawings.

DETAILED DESCRIPTION OF THE PREFERRED EMBODIMENTS

Figure 1:
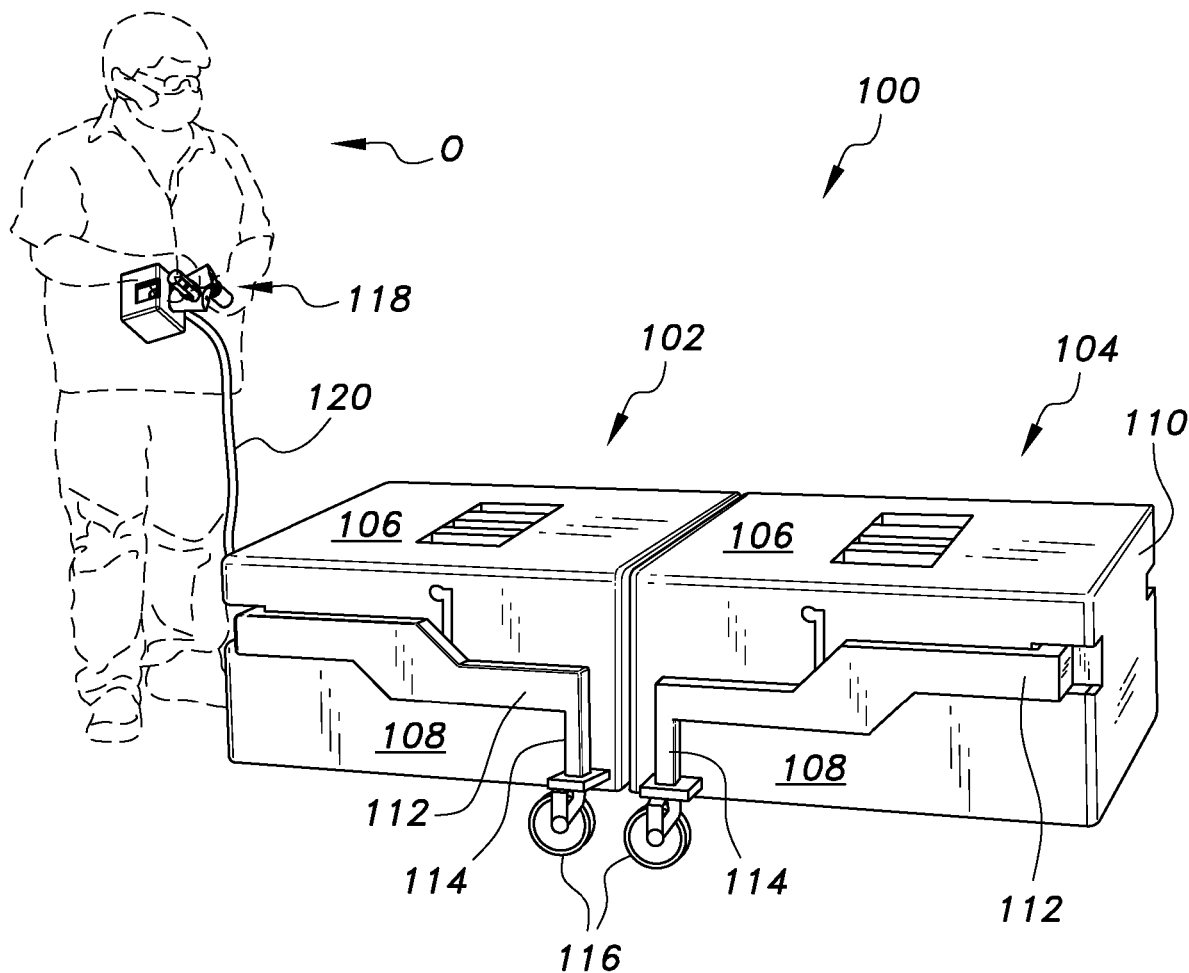
FIG. 1 is an environmental perspective view of a first embodiment of a multiple maneuvering system for various applications in a compact configuration.
Figure 2:
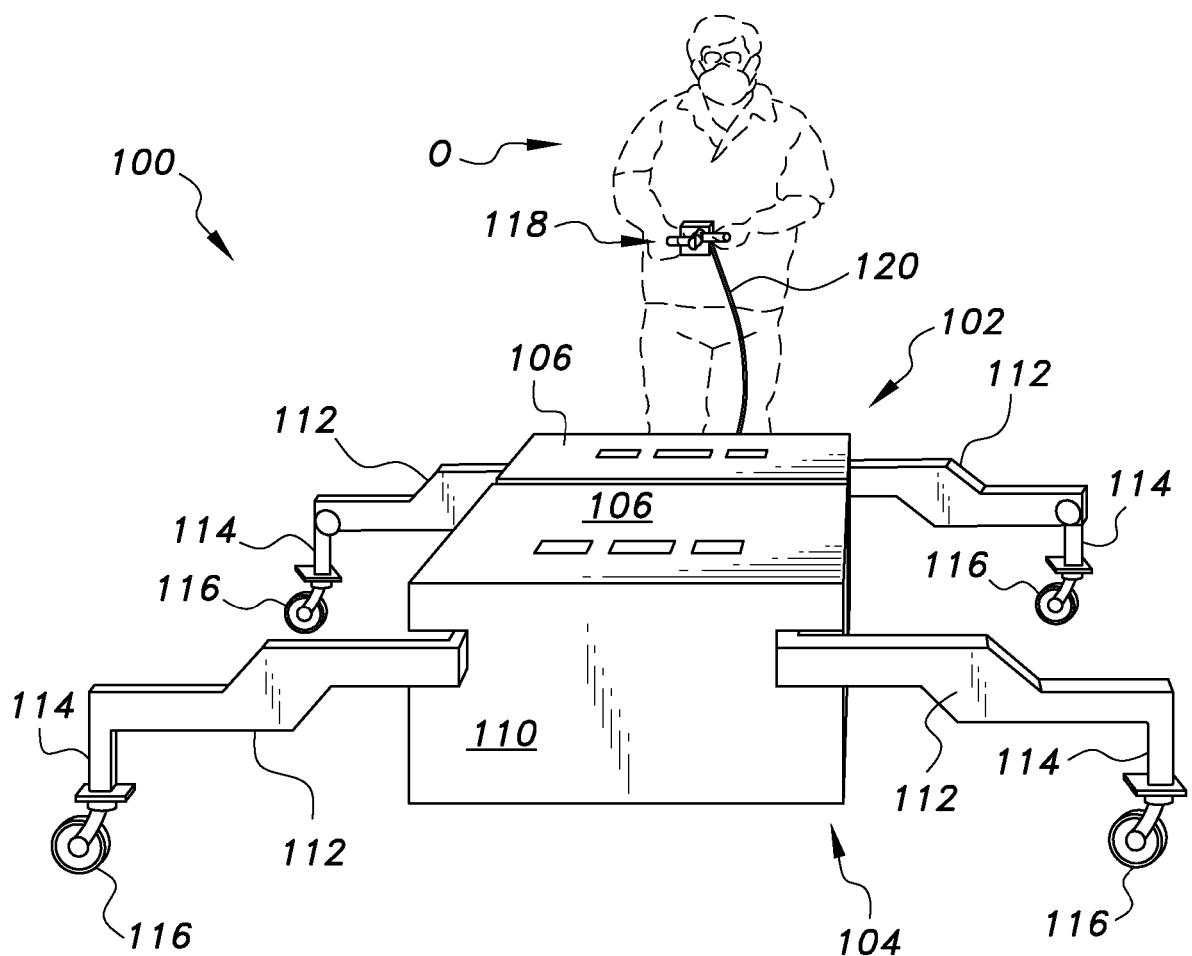
FIG. 2 is an environmental perspective view of the multiple maneuvering system for various applications of FIG. 1 in an extended configuration.

A first embodiment of a multiple maneuvering system 100 is shown in FIG. 1 in a compact configuration and in FIG. 2 in a fully extended configuration. The multiple maneuvering system 100 is a multiple parallel maneuvering system (MPMS) and includes a first parallel maneuvering unit (PMU) 102, and a second PMU 104. Each of the PMUs 102, 104 includes a top, load bearing panel 106, left and right-side panels 108 and end panels 110. Both of the PMUs 102, 104 also includes left and right detachable safety leg assemblies. Each safety leg assembly includes a horizontal bar or arm 112, with the proximate end of the arm 112 being rotatable attached to their respective PMU, as described in detail with respect to FIGS. 3-5. A vertical post 114 has an upper end attached to and extends downward from the distal end of the horizontal bar 112, and a caster wheel 116 is rotatably attached to the lower end of the vertical post and contacts and rolls on the ground. As shown in FIG. 1, the MPMS 100 is in its compact configuration, with the safety leg assemblies retracted such that arms 112 are parallel to and in close proximity to the side panels 108. In this configuration, the MPMS 100 is easily maneuvered in close quarters, such as aisles. As is shown in FIG. 2, the safety leg assemblies are extended such that arms 112 are perpendicular to the side panels 108, such that the caster wheels 116 are extended far to the sides of the MPMS 100, thereby providing additional lateral stability. To control the PMUs 102, 104 an operator O uses a control actuator 118, as described below with respect to FIGS. 18A-18B. While the control actuator 118 is shown connected to the MPMS 100 by an electrical cable 120, it should be understood that the control actuator 118 and MPMS may be connected wirelessly, if desired.

Figure 3:
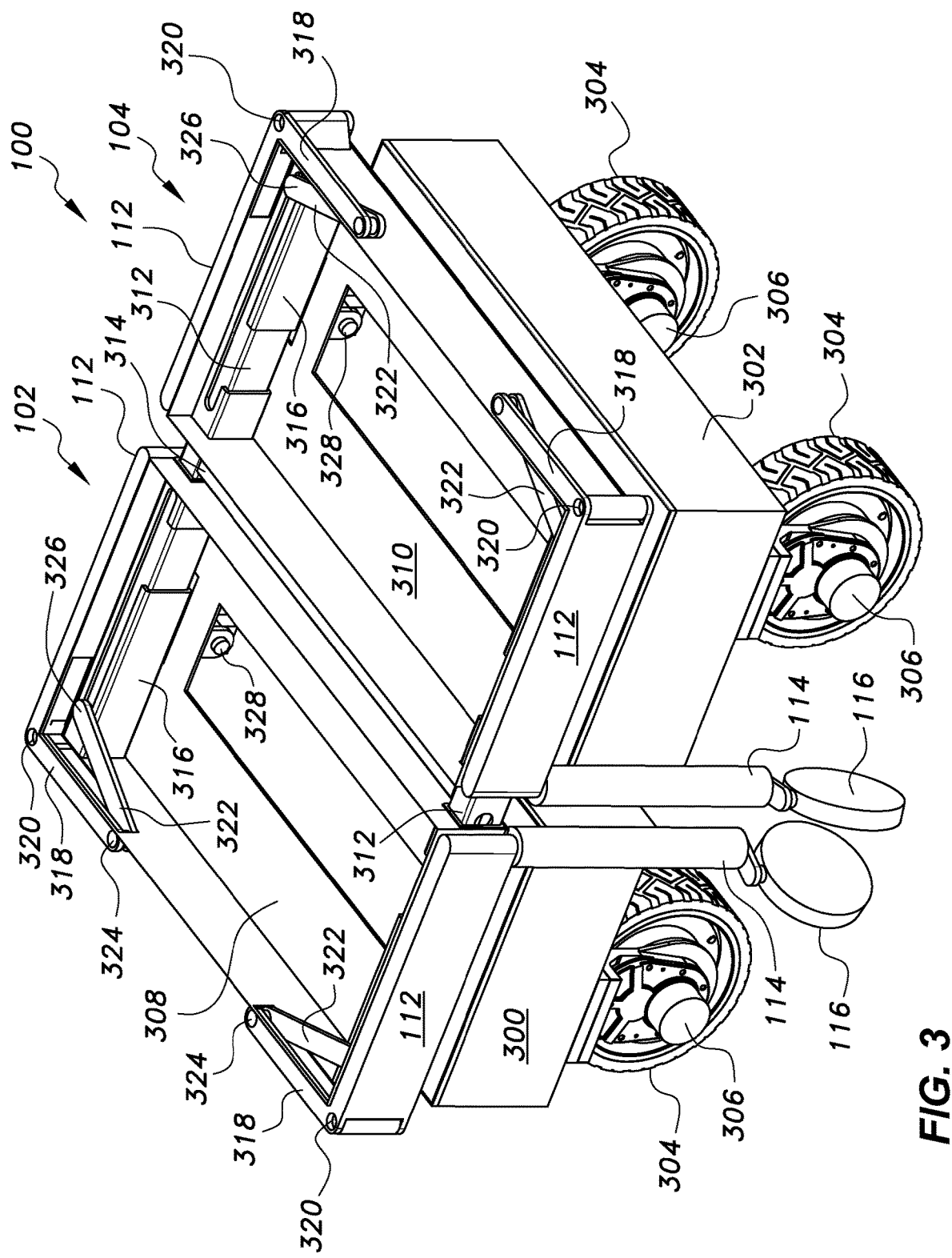
FIG. 3 is a perspective view of the multiple maneuvering system for various applications of FIG. 1 in a compact configuration, with its outer covers removed to show details of its interior.
Figure 4:
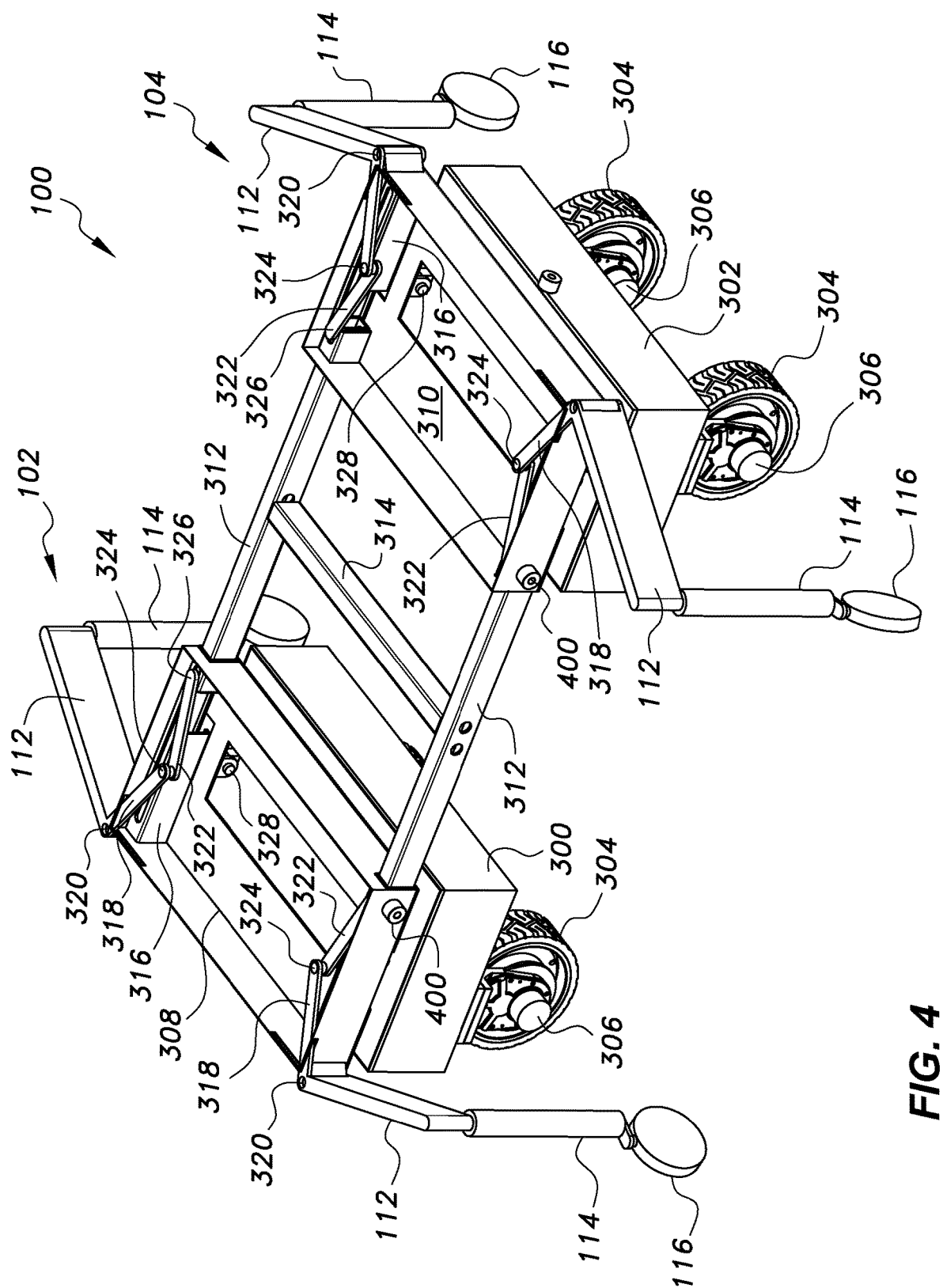
FIG. 4 is a perspective view of the multiple maneuvering system for various applications of FIG. 3 in an extended configuration.

In FIGS. 3-4, the panels 106, 108, 110 have been removed to show the inner details of the MPMS 100. PMU 102 includes a chassis 300 with two wheels 304 (one shown) rotatably mounted to chassis 300 about steering axes and on rolling axles (not shown) mounted in hubs 306. Similarly, PMU 104 includes a chassis 302 with two wheels 304 rotatably mounted to chassis 302 about steering axes and on rolling axles (not shown) mounted in hubs 306. The steering and driving mechanisms for the PMUs 102, 104 operate as those shown with respect to the PMUs described below and shown in FIGS. 15A-17B. A safety leg extension and retraction mechanism and a linearly adjustable structure is mounted on top of the chassis 300, 302. The linearly adjustable structure is a telescoping mechanism such that the chassis 300 and the chassis 302 can be extended or retracted from one another. The safety leg extension and retraction mechanism and the telescoping mechanism include a first frame 308 mounted on top of the chassis 300 and a second frame 310 mounted on top of the chassis 302. The frames 308, 310 are rotatably mounted to the top of their respective chassis 300, 302 by horizontal pivot pins 328 to provide for relative vertical movement between the PMUs 102, 104 when traveling over uneven surfaces.

Figure 5:
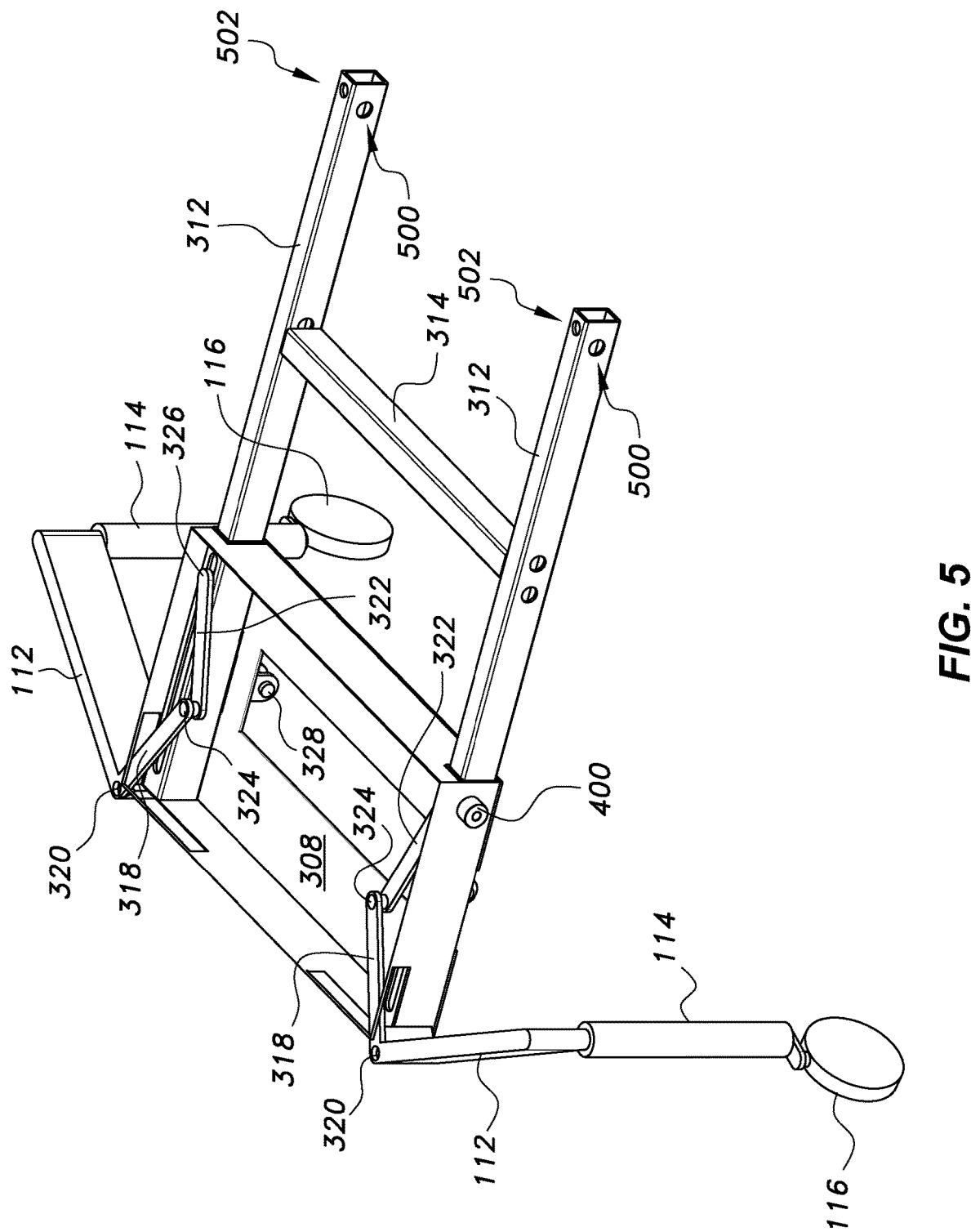
FIG. 5 is a perspective view of an interconnecting bridge and stabilizer wheel extension mechanism of the multiple maneuvering system for various applications of FIG. 3.

The details of the telescoping mechanism are shown in FIGS. 3-5. The telescoping mechanism includes two longitudinally extending beams 312 that are connected to one another by a laterally extending beam 314 that extends between the approximate centers of the longitudinally extending beams 312. The ends of the longitudinally extending beams 312 are slidingly received in channels 316 mounted on the sides of the frames 308, 310. The longitudinally extending beams 312 include through holes 500 in their side panels adjacent their ends. The longitudinally extending beams 312 also include through holes 504 in their side panels adjacent the laterally extending beam 314. Locking mechanisms in the form of position locks 400 include pins (not shown) that extend through holes 500 to lock the telescoping mechanism in its extended position such that the PMUs 102, 104 are maintained a maximum distance apart from one another. The position lock pins extend through holes 504 to lock the telescoping mechanism in its retracted position, such that the PMUs 102, 104 are maintained a minimum distance apart from one another. By locking the telescoping mechanism, the stability of the MPMS 100 is increased in both its compact configuration and its fully extended configuration. To transition between configurations, the pins of the position locks 400 are retracted, thereby unlocking the telescoping mechanism.

In order to transition the MPMS 100 from its compact configuration (FIG. 3) to its extended configuration (FIG. 4), the operator O uses the control actuator 118 to steer and drive the wheels 304 of the PMU 100 away from the PMU 200, or to steer and drive the wheels 304 of the PMU 200 away from the PMU 100, or to simultaneously steer and drive the wheels 304 of the PMU 100 away from the PMU 200 while steering and driving the wheels 304 of the PMU 200 away from the PMU 100. In order to transition the MPMS 100 from its extended configuration (FIG. 4) to its compact configuration (FIG. 3), the operator O uses the control actuator 118 to steer and drive the wheels 304 of the PMU 100 toward the PMU 200, steer and drive the wheels 304 of the PMU 200 toward the PMU 100, or simultaneously steer and drive the wheels 304 of the PMU 100 toward the PMU 200 while steering and driving the wheels 304 of the PMU 200 toward the PMU 100.

The details of the safety legs and the safety leg extension and retraction mechanism are shown in FIGS. 3-5. The safety leg extension and retraction mechanism is operated by the telescoping mechanism to retract arms 112 in the compact configuration, and to extend the arms 112 in the extended configuration. The safety legs include vertical posts 114 that have upper ends attached to and extending downward from the distal ends of the arms 112, and lower ends with caster wheels 116 mounted thereon for engaging and freely rolling on the ground. The arms 112 are rotatable attached to the outside corners of the frames 308, 310 by a hinge assembly 320. The arms 112 include integral first links 318 extending perpendicularly to the arms 112 and attached to the proximate ends of the arms 112. Second links 322 have a proximate end rotatable attached to the distal ends of the first links 318 by pivots 324, and distal ends rotatable attached to the ends of the longitudinally extending beams 312 by pivots 326. Pivots 324 may be in the form of fasteners (nut/bolt, rivet, etc.) extending through holes in the distal ends of the first links 318 and holes in the proximate ends of the second links 322. Pivots 326 may be in the form of fasteners (nut/bolt, rivet, etc.) extending through holes in the distal ends of the second links 322 and through holes 502 (FIG. 5) near the ends of the longitudinally extending beams 312.

In operation, as the PMUs 100, 200 move away from each other, the longitudinally extending beams 312 are pulled out of their respective channels 316 and pull the second links 322 and the attached distal ends of the first links 318 toward the center of the MPMS 100, thereby rotating the arms 112 outwardly. Conversely, as the PMUs 100, 200 move toward each other, the longitudinally extending beams 312 are pushed into their respective channels 316 and push the second links 322 and the attached distal ends of the first links 318 away from the center of the MPMS 100, thereby rotating the arms 112 inwardly. The entire safety leg assembly is detachable from the MPMS 100 by removing the hinge pins from the hinge assemblies 320 and the pivots 326, and then guiding the links 318, 322 out through corner openings in the frames 308, 310.

Figure 6:
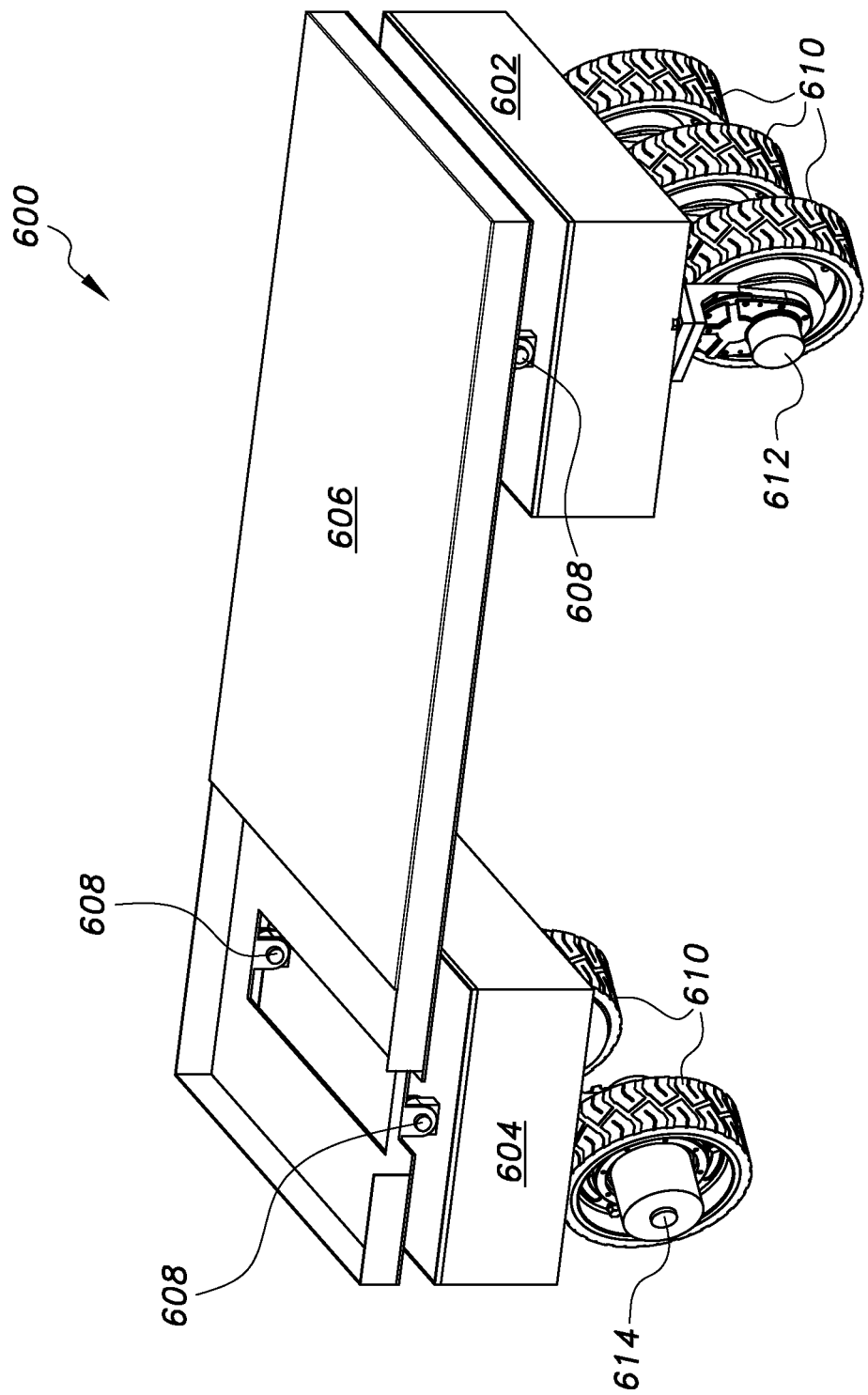
FIG. 6 is a perspective view of a second embodiment of a multiple maneuvering system for various applications.
Figure 7:
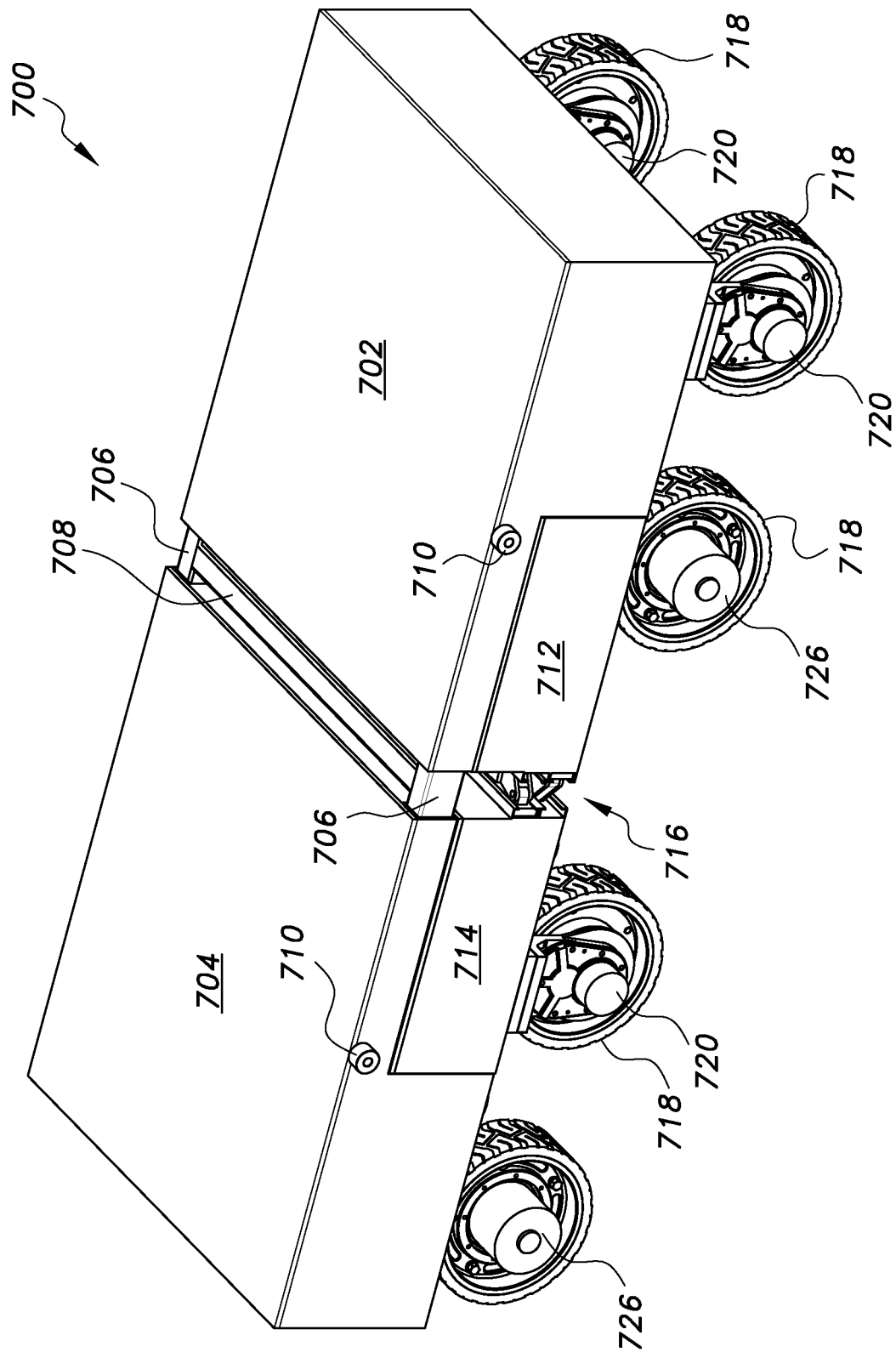
FIG. 7 is a perspective view of a third embodiment of a multiple maneuvering system for various applications in a compact configuration.

A second embodiment of an MPMS 600 is shown in FIG. 6. This embodiment is useful for applications where relative linear motion between the PMUs is not required. A first PMU 602 is connected to a second PMU 604 by a rigid load bearing panel 606. The PMUs 602, 604 are attached to the load bearing panel 606 by horizontal pivot pins 608 to provide for relative vertical movement between the PMUs 602, 604 when traveling over uneven surfaces. In this embodiment, PMU 602 includes three wheels 610 rotatably mounted to the chassis about steering axes and on rolling axles (not shown) mounted in hubs 612. Similarly, PMU 604 includes a chassis with two wheels 610 rotatably mounted to the chassis about steering axes and on rolling axles (not shown) mounted in hubs (not shown). The steering and driving mechanisms for the PMUs 602, 604 operate as those shown with respect to the PMUs described below and shown in FIGS. 15A-17B. One or more of the wheels 610 may include a motor 614 for driving the wheel about its rolling axis. It should be noted that while the PMU 602 is shown with three wheels and the PMU 604 is shown with two wheels, any number of wheels may be used in each PMU, and the various embodiments of the multiple maneuvering systems for various applications should not be deemed limited to any specific number of wheels.

A third embodiment of an MPMS 700 is shown in FIGS. 7-10. The MPMS 700 is shown in its compact configuration in FIG. 7. The MPMS 700 includes a first PMU 702 and a second PMU 704. The first PMU 702 includes a chassis with two wheels 718 rotatably mounted to the chassis about steering axes and on rolling axles (not shown) mounted in hubs 720. Similarly, PMU 704 includes a chassis with two wheels 718 (one shown) rotatably mounted to the chassis about steering axes and on rolling axles (not shown) mounted in hubs (not shown). The PMUs 702, 704 both have recesses 800 (best seen in FIG. 10), sized and shaped to snugly receive a third PMU 712 and a fourth PMU 714 when the MPMS 700 is in its compact configuration. The third PMU 712 includes a chassis with two wheels 718 (one shown) rotatably mounted to the chassis about steering axes and on rolling axles (not shown) mounted in hubs 720 (not shown). Similarly, PMU 714 includes a chassis with two wheels 718 rotatably mounted to the chassis about steering axes and on rolling axles (not shown) mounted in hubs (one shown). The steering and driving mechanisms for the PMUs 702, 704, 712, 714 operate as those shown with respect to the PMUs described below and shown in FIGS. 15A-17B. One or more of the wheels 718 may include a motor 726 for driving the wheel about its rolling axis. The PMUs 702, 704, 712, 714 are connected to one another by a rotating and dual linear translation mechanism 716.

The details of the rotation and dual linear translation (RDLT) mechanism 716 are best seen in FIGS. 8-11. The RDLT mechanism 716 includes a first linearly adjustable structure in the form of a telescoping mechanism as a connecting structure between PMUs 702, 704. The telescoping mechanism of the RDLT mechanism 716 is as described above with respect to the telescoping mechanism of the first embodiment, and as shown in FIGS. 3-5. As in the first embodiment the telescoping mechanism of the RDLT mechanism 716 includes two longitudinally extending beams 706 that are connected to one another by a laterally extending beam 708 that extends between the approximate centers of the longitudinally extending beams 706. The ends of the longitudinally extending beams 706 are slidingly received in channels mounted within the PMUs 702, 704. Locking mechanisms in the form of position locks 710 lock the telescoping mechanism in its extended position or its retracted position. As in the first embodiment, to transition between configurations, the pins (not shown) of the position locks 710 are retracted, thereby unlocking the telescoping mechanism and allowing relative linear motion between PMUs 702, 704.

Figure 11:
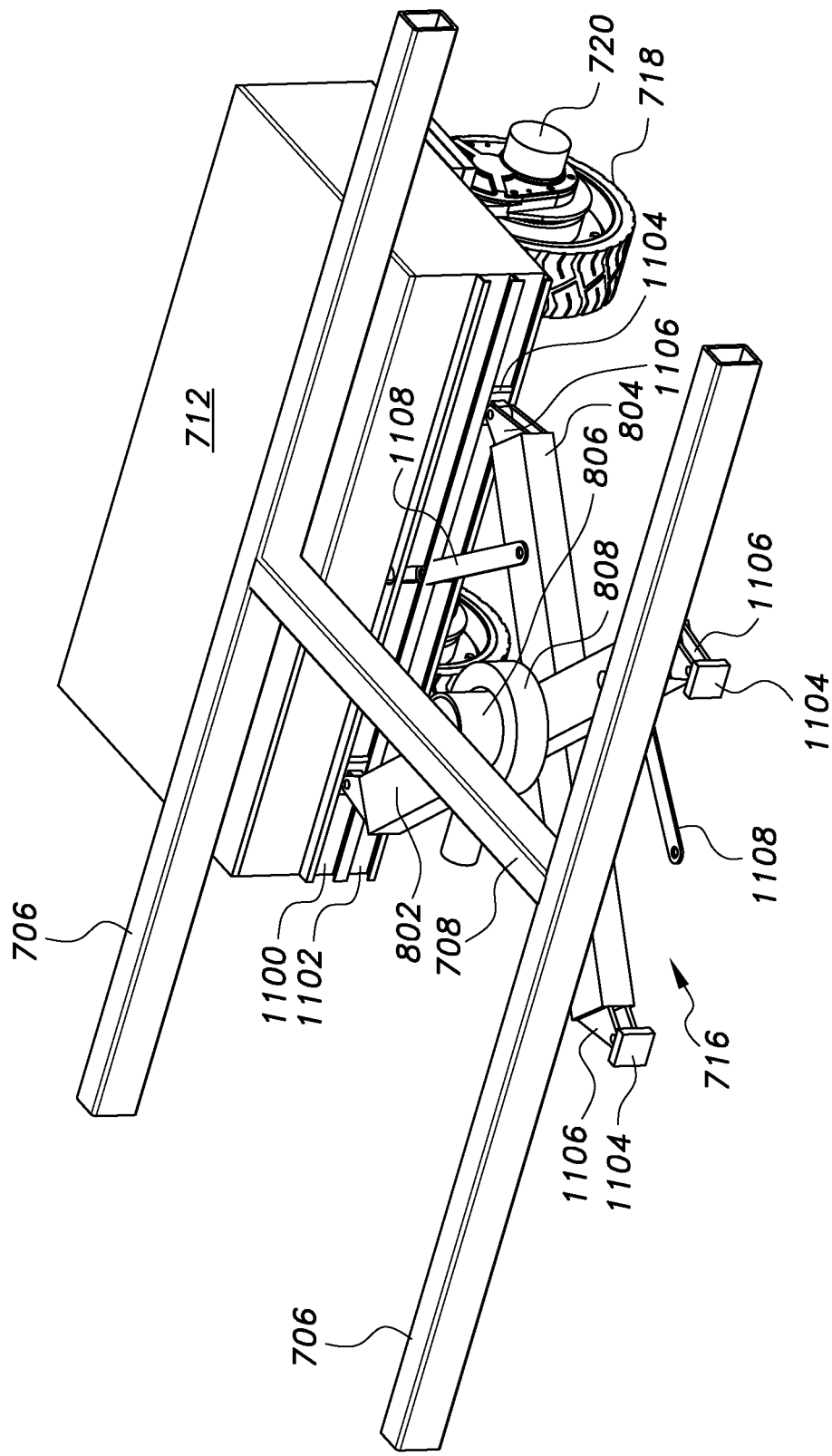
FIG. 11 is a perspective view of an interconnecting bridge and rotation mechanism of the multiple maneuvering system for various applications of FIG. 7.

The RDLT mechanism 716 further includes a second linearly adjustable structure in the form of a scissor-type mechanism as a connecting structure between PMUs 712, 714. The scissor-type mechanism includes an upper cross member 802 and a lower cross member 804. The upper cross member 802 and the lower cross member 804 are connected to one another by a vertical pivot at their centers. As best seen in FIG. 11, sliders 1104 are connected to both ends of the cross members 802, 804 using angled brackets 1106. The inside sidewall of the PMUs 712, 714 include an upper 1100 and a lower 1102 track. The tracks 1100, 1102 are U-shaped in cross section, for slidingly receiving the sliders 1104 therein. The sliders 1104 of the upper cross member 802 are slidingly received in the upper track 1100, and the sliders 1104 of the lower cross member 804 are slidingly received in the lower 1102 track. Centering linkages 1108 include proximate ends rotatable attached to the inside sidewall of the PMUs 712, 714, and distal ends rotatable attached to the top surface of the cross members 802, 804. As the scissor-type mechanism extends, the sliders 1104 slide toward the center of the tracks 1100, 1102, and as the scissor-type mechanism retracts, the sliders 1104 slide toward the ends of the tracks 1100, 1102. The centering linkages 1108 maintain the sliders 1104 within the tracks 1100, 1102, by limiting the extent the sliders 1104 can travel toward the ends of the tracks 1100, 1102.

A rotation mechanism or bearing 806 connects the top center of the upper cross member 802 to the bottom center of the laterally extending beam 708, to thereby provide relative rotational motion between PMUs 702, 704 and PMUs 712, 714. A rotational brake 808 is mounted on the rotation bearing 806 to lock the bearing 806 and maintain the rotational position of the telescoping mechanism relative to the scissor-type mechanism. The construction of the rotation bearing 806 and rotational brake 808 may be similar to those shown and described in U.S. Pat. No. 11,015,664, issued to Cui et al. on May 25, 2021 and hereby incorporated by reference in its entirety.

Figure 8:
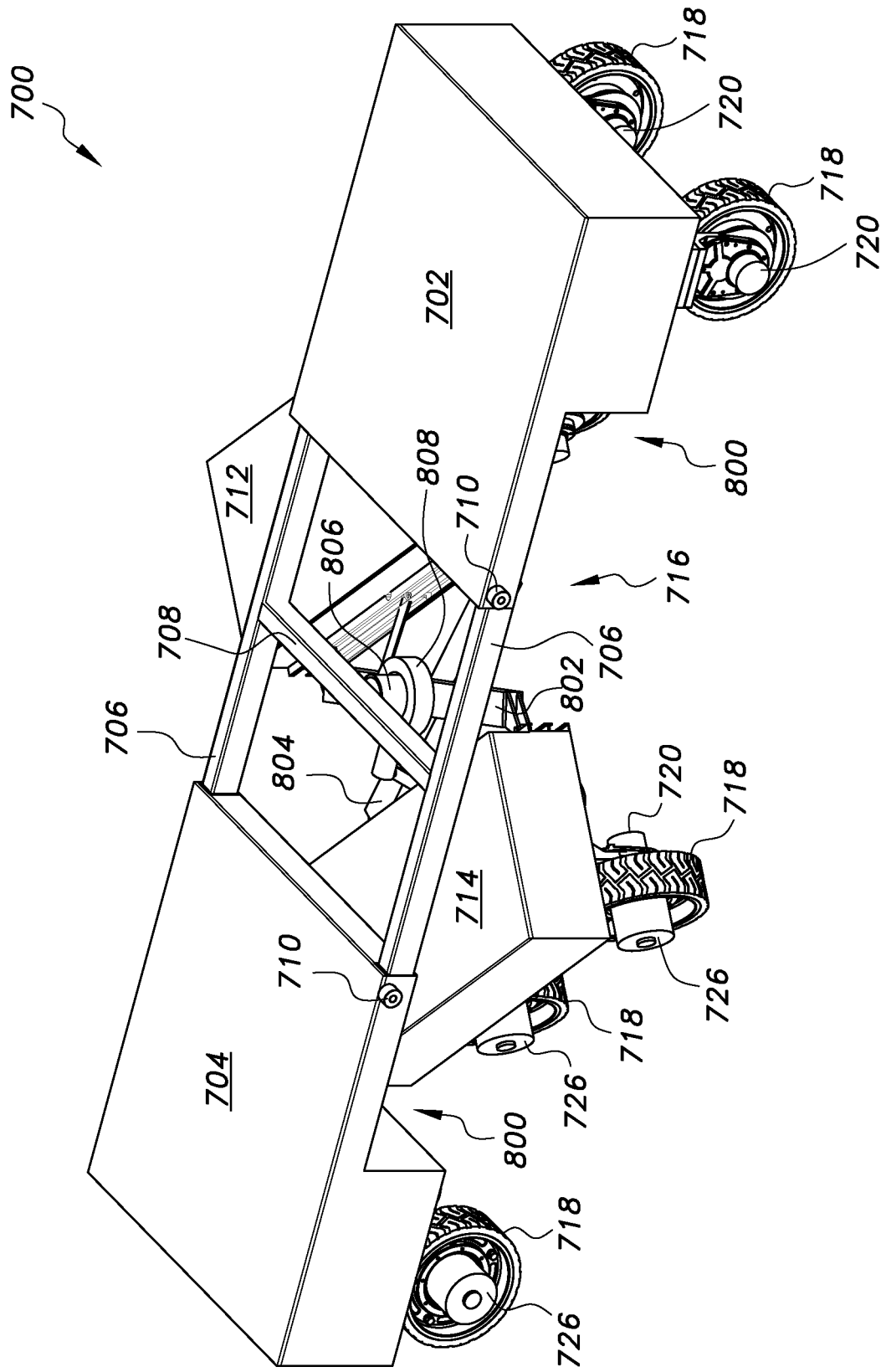
FIG. 8 is a perspective view of the multiple maneuvering system for various applications of FIG. 7 in a first intermediate configuration.
Figure 9:
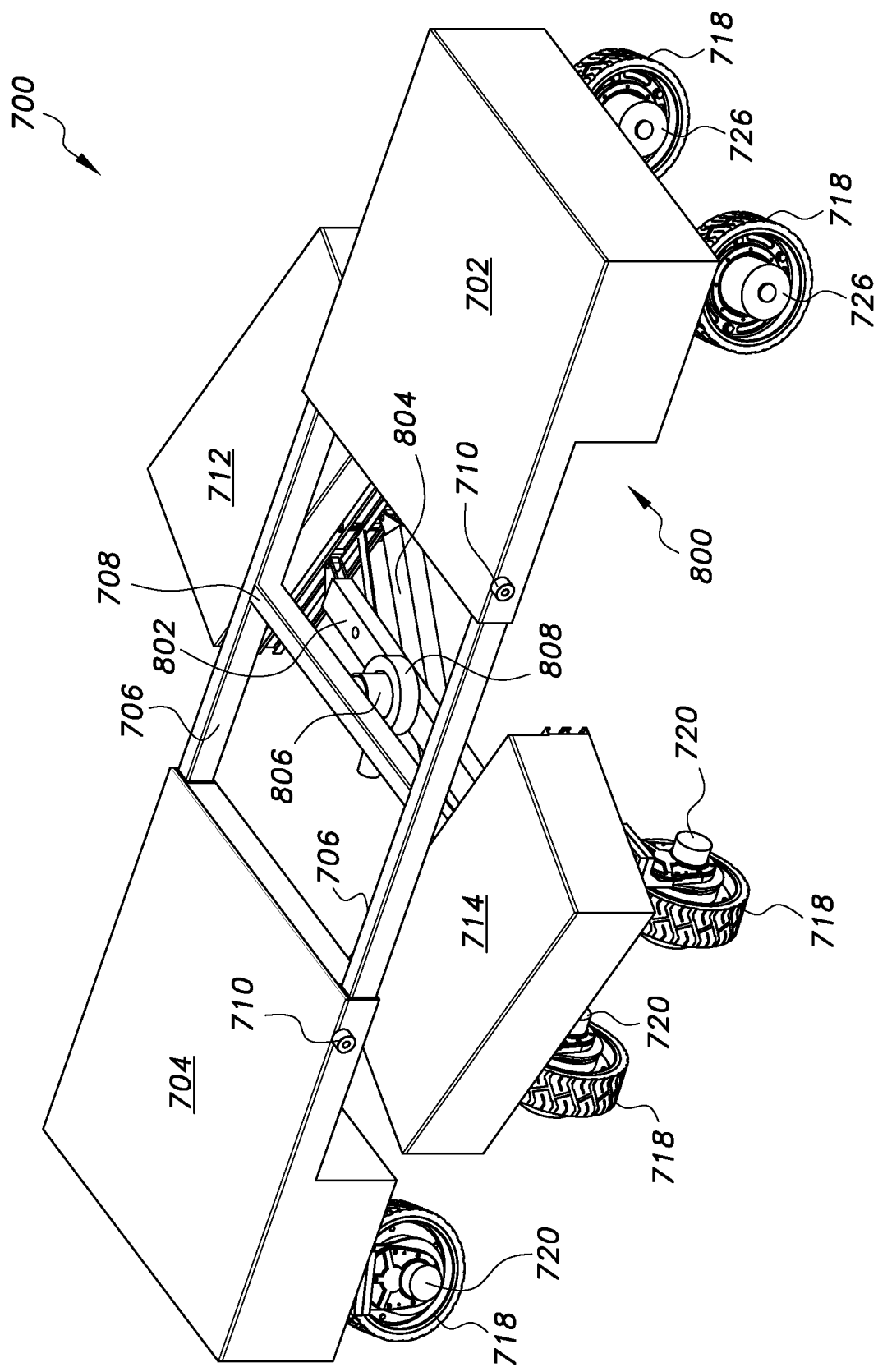
FIG. 9 is a perspective view of the multiple maneuvering system for various applications of FIG. 7 in a second intermediate configuration.
Figure 10:
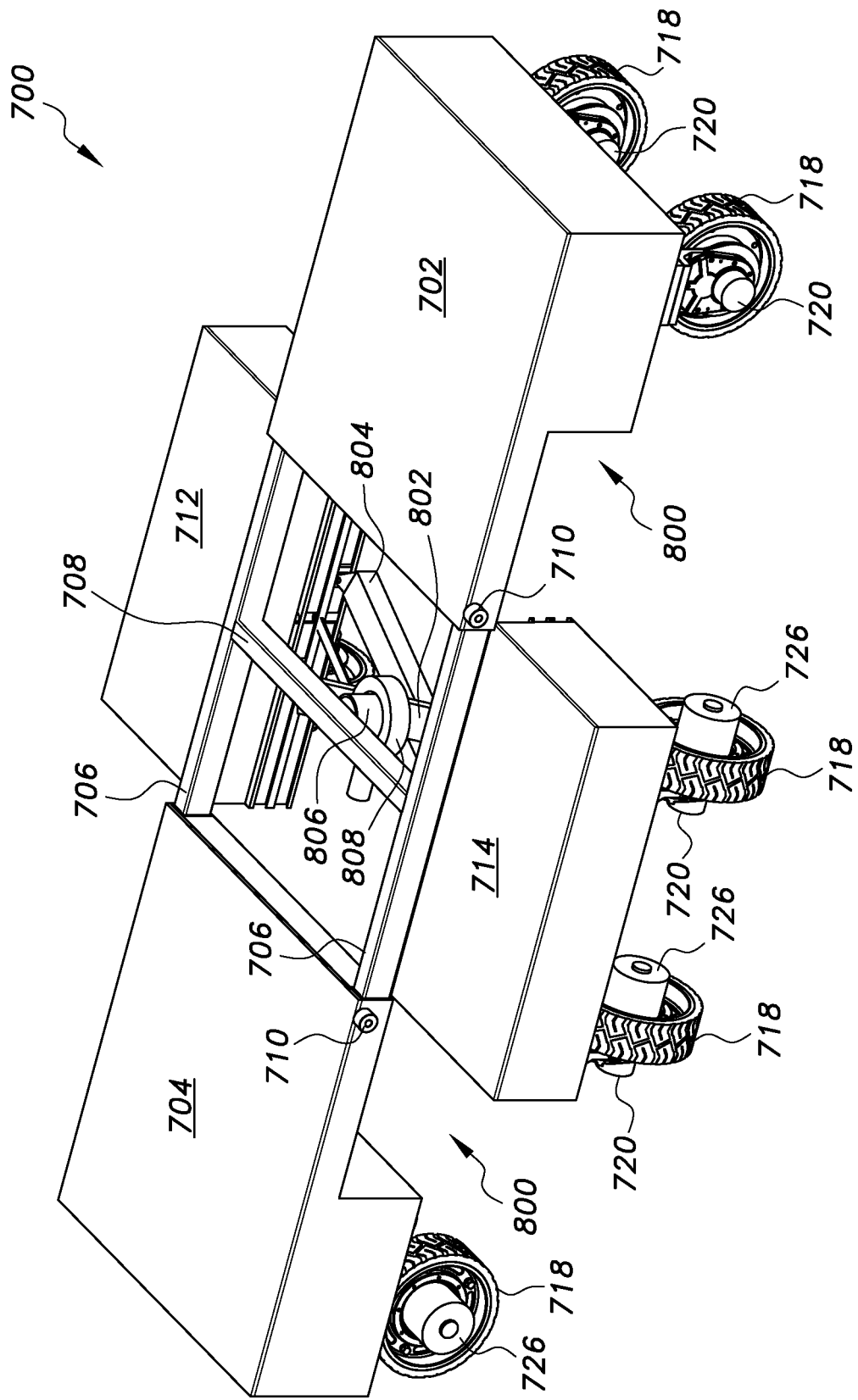
FIG. 10 is a perspective view of the multiple maneuvering system for various applications of FIG. 7 in a transverse configuration.

To transition the MPMS 700 from its compact configuration (FIG. 7) to its transverse configuration (FIG. 10), an operator O first uses the control actuator 118 to simultaneously steer and drive the wheels 718 of the PMU 702 away from the PMU 704 while steering and driving the wheels 718 of the PMU 704 away from the PMU 702, until the telescoping mechanism is in its maximum extended position as shown in FIG. 8. The operator O then uses the control actuator 118 to steer and drive the wheels 718 of the PMU 712 in a first direction, while steering and driving the wheels 304 of the PMU 714 in a second direction opposite to the first direction, to thereby rotate the PMUs 712, 714 and the scissor-type mechanism relative to the PMUs 702, 704 and the telescoping mechanism. The operator O may steer and drive the wheels 718 of the PMUs 712, 714, such that the first direction and second direction are diverging, thereby increasing the distance between PMUs 712, 714, while simultaneously rotating the PMUs 712, 714 and the scissor-type mechanism relative to the PMUs 702, 704 and the telescoping mechanism, resulting in a first intermediate configuration as shown in FIG. 8. Continuing the process, the distance between PMUs 712, 714, increases as does the relative rotation between the PMUs 712, 714 and PMUs 702, 704, resulting in a second intermediate configuration as shown in FIG. 9. In this configuration, the distance between the PMUs 712, 714 is at or near its maximum and the scissor-type mechanism is fully extended. The operator O then uses the control actuator 118 to steer and drive the wheels 718 of the PMU 712 in a first direction, while steering and driving the wheels 304 of the PMU 714 in a second direction opposite to the first direction, to thereby rotate the PMUs 712, 714 relative to the PMUs 702, 704, resulting in the transverse configuration as shown in FIG. 10. It should be noted that many different steering motions may be used to transition the MPMS 700 from its various configurations, and the above-described procedure is just provided as an example. In addition, MPMS 700 is capable of many different configurations, only a few of which are shown in FIGS. 7-10.

Figure 12:
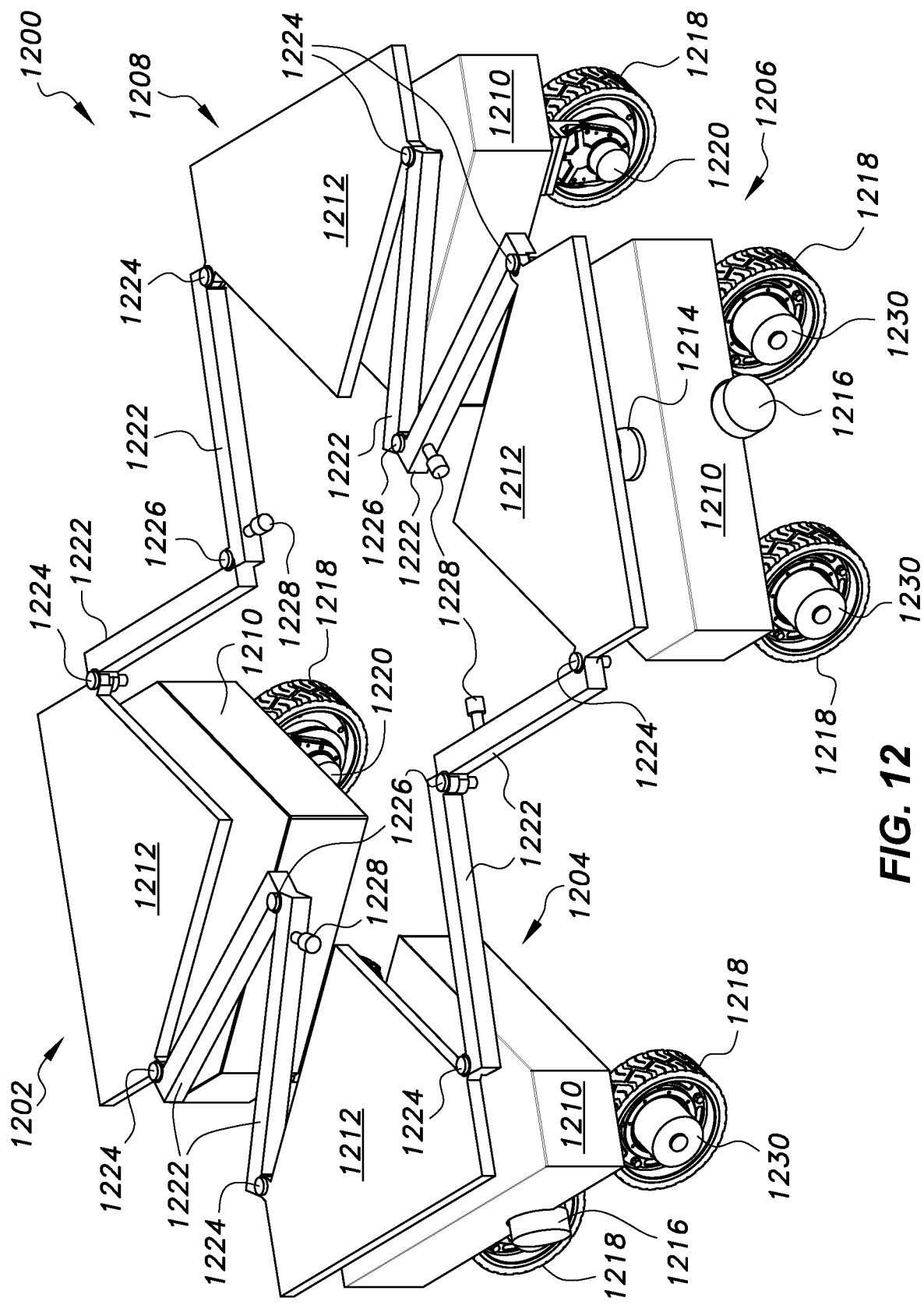
FIG. 12 is a perspective view of a fourth embodiment of a multiple maneuvering system for various applications.

A fourth embodiment of an MPMS 1200 is shown in FIG. 12, in an intermediate configuration. In the embodiment shown, the MPMS 1200 includes four PMUs 1202, 1204, 1206, 1208, although embodiments using two, three, five or more PMUs are contemplated. Each of the PMUs 1202, 1204, 1206, 1208 includes a chassis 1210 with a steering actuator 1216, and two wheels 1218 rotatably mounted to the chassis 1210 about steering axes and on rolling axles (not shown) mounted in hubs 1220. One or both of the wheels 1218 of each PMU 1202, 1204, 1206, 1208 may include a motor 1230 for driving the wheel 1218 about its rolling axis. The steering and driving mechanisms for the PMUs 1202, 1204, 1206, 1208 operate as those shown with respect to the PMUs described below and shown in FIGS. 15A-17B. Each of the PMUs 1202, 1204, 1206, 1208 further includes a load bearing panel 1212, mounted on top of the chassis 1210 using a spherical joint or bearing 1214. The spherical bearing 1214 allows the load bearing panel 1212 to rotate and tilt relative to the chassis 1210.

The load bearing panels 1212 of each of the PMUs 1202, 1204, 1206, 1208 are interconnected by a plurality of linkages 1222. The linkages 1222 have a proximate end rotatably attached to tabs extending from corners of the load bearing panels 1212, by a vertical pivot pin 1224 extending through holes in the tabs and in the proximate end of the linkages 1222. The distal ends of the linkages 1222 are rotatably attached to the distal ends of adjacent linkages 1222 by vertical pivot pins 1226 extending through holes in the distal ends of the linkages 1222, to form a complete circuit about the MPMS 1200. As the vertical pivot pins 1224, 1226, allow for horizontal motion only, all of the load bearing panels 1212 and the linkages 1222 are substantially in the same plane. The spherical bearings 1214 allow the load bearing panels 1212 to tilt and rotate to compensate for uneven terrain that results in some of the PMUs 1202, 1204, 1206, 1208 being at different elevations.

Figure 13:
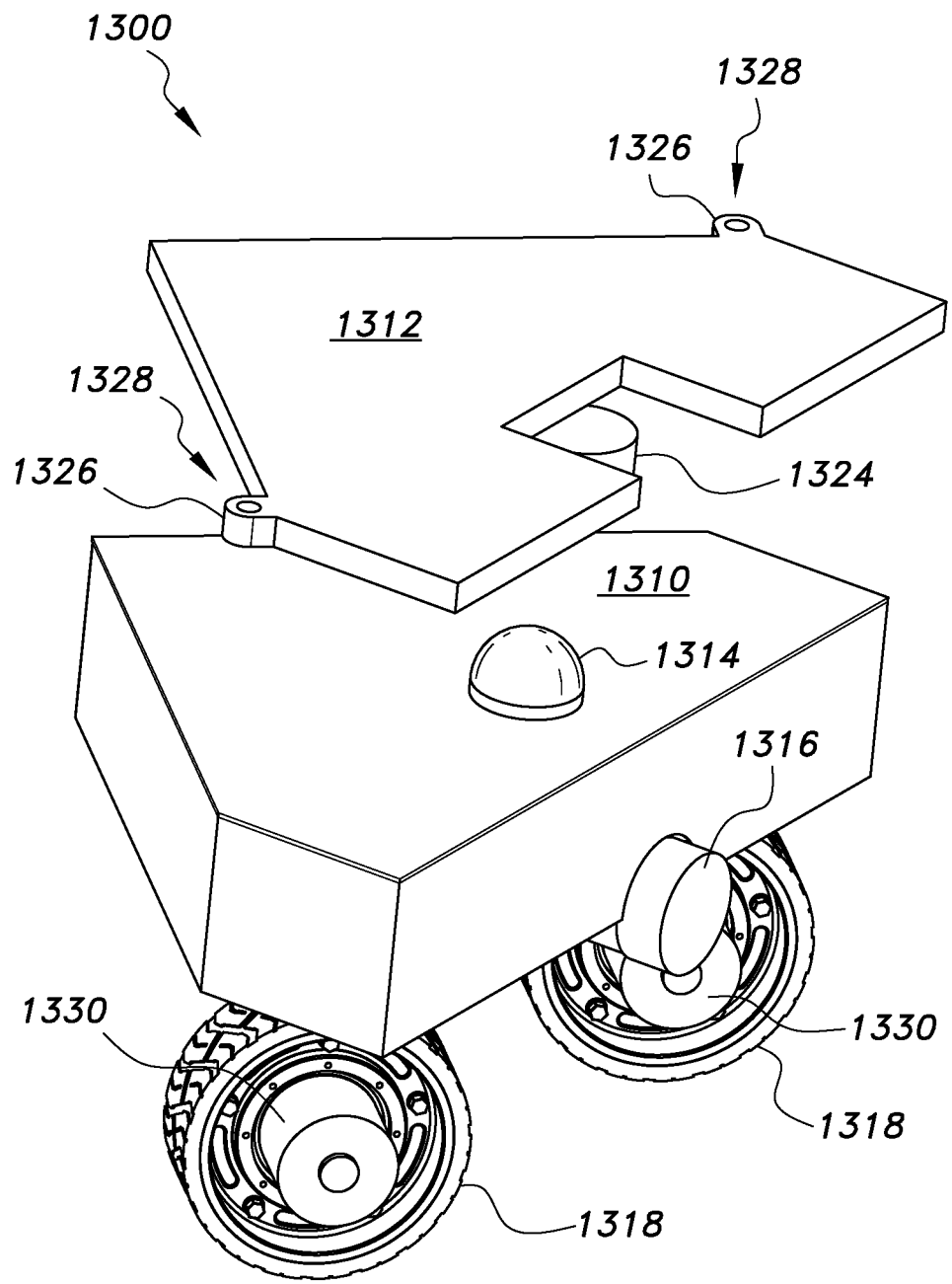
FIG. 13 is a perspective view of one of the parallel maneuvering units of the multiple maneuvering system for various applications of FIG. 12.

FIG. 13 shows another example of a PMU 1300. The PMU 1300 represents any of the PMUs 1202, 1204, 1206, 1208, and similarly includes a chassis 1310 with a steering actuator 1316, and two wheels 1318 rotatably mounted to the chassis 1310 about steering axes and on rolling axles (not shown) mounted in hubs 1320. One or both of the wheels 1318 may include a motor 1330 for driving the wheel 1318 about its rolling axis. The steering and driving mechanism for the PMU 1300 operates as those shown with respect to the PMUs described below and shown in FIGS. 15A-17B. The PMU 1300 further includes a load bearing panel 1312, mounted on top of the chassis 1310 using a spherical joint or bearing. The spherical bearing includes a lower portion 1314 with an upper convex spherical surface that is received in a lower concave spherical surface (not shown) on an upper portion 1324 of the spherical bearing. The spherical bearing allows the load bearing panel 1312 to rotate and tilt relative to the chassis 1310. FIG. 13 also shows the details of the tabs 1326 of PMU 1300. The tabs 1326 include through holes 1328 for receipt of the vertical pivot pins 1224, as described above with respect to MPMS 1200.

FIGS. 14A-17B illustrate a series of maneuvering and parallel maneuvering units (PMUs). Portions of the PMUs have been removed to show the details of the steering mechanisms of the PMUs.

Figure 14A:
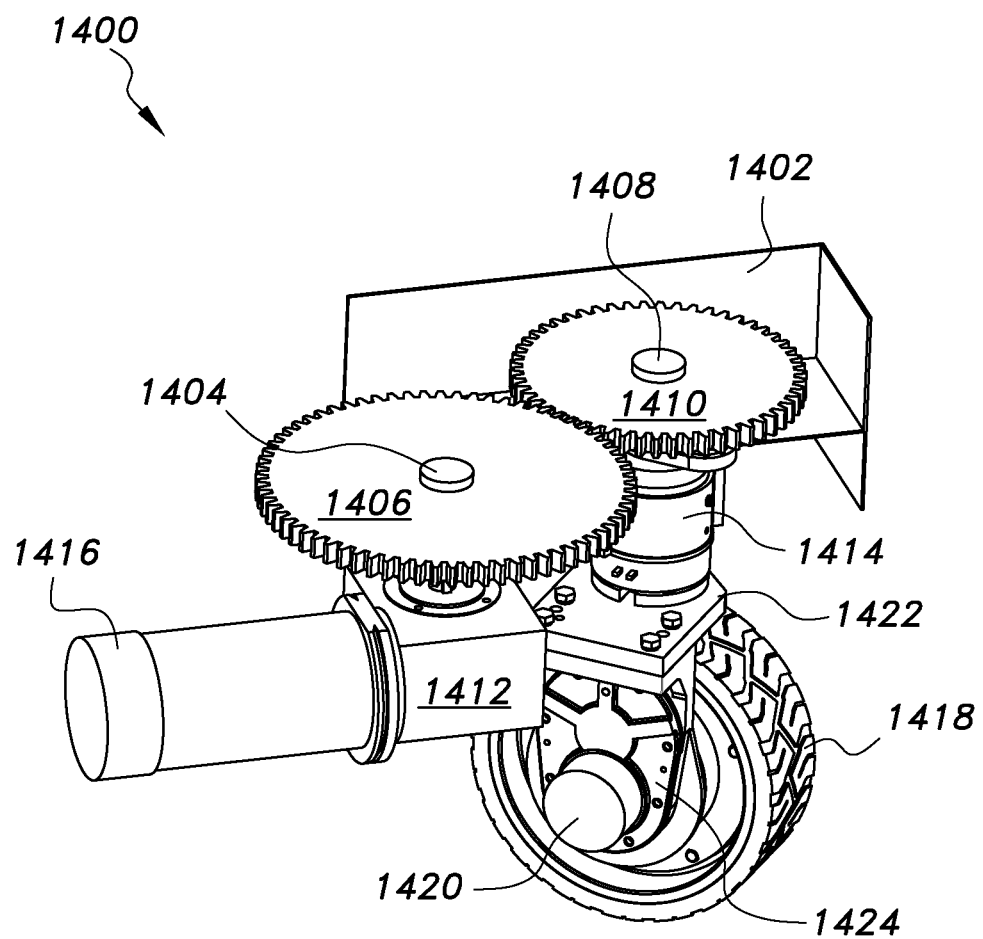
FIG. 14A is a first perspective view of a single wheel maneuvering unit.
Figure 14B:
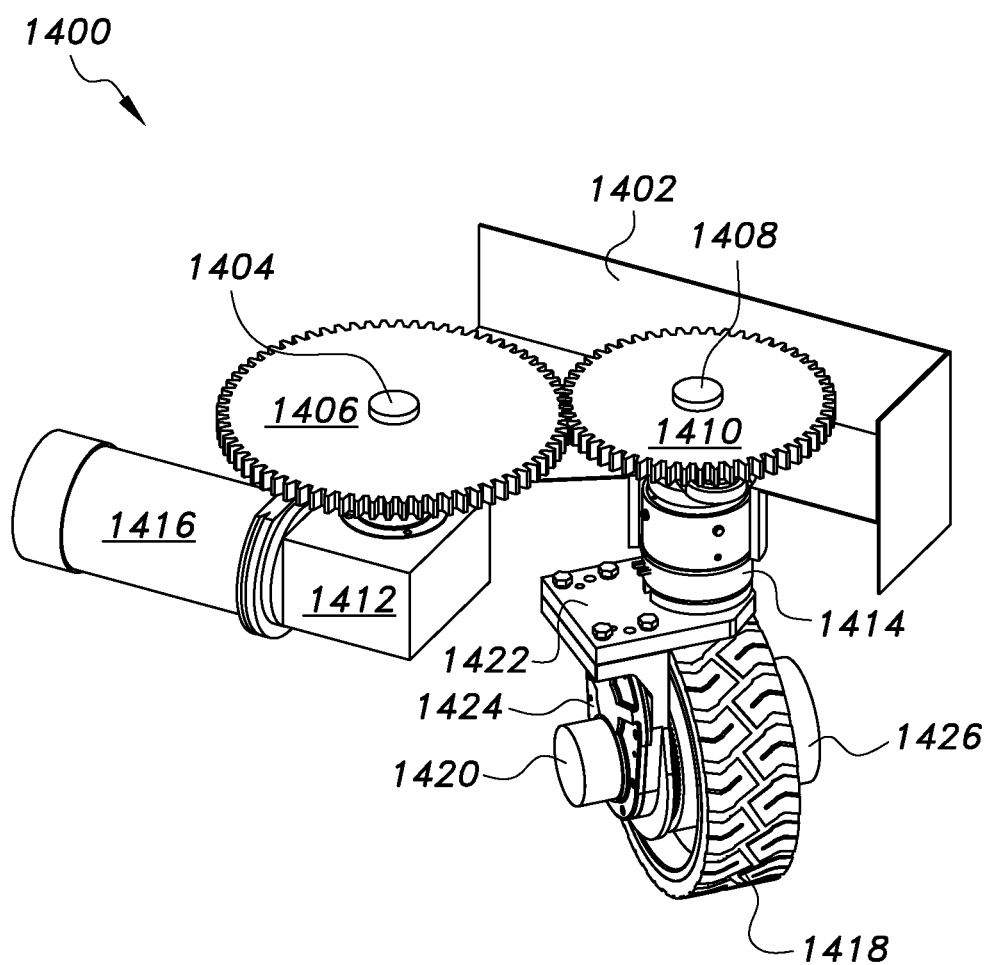
FIG. 14B is a second perspective view of the single wheel maneuvering unit of FIG. 14A.

FIGS. 14A-14B show the details of the steering mechanism of a single wheel maneuvering unit 1400. The single wheel maneuvering unit 1400 includes a frame 1402 which may be part of the maneuvering unit's chassis. A driving shaft 1404 has a driving gear 1406 mounted on its top end. A driven shaft 1408 has a driven gear 1410 mounted on its top end. The driving shaft 1404 is driven by a steering actuator 1416 via a 90-degree gear box 1412. The driven shaft 1408 extends through a steering yoke 1414 and is connected to one end of a horizontal plate 1422. A downwardly extending bracket 1424 is attached to the opposite end of the horizontal plate 1422. An axle (not shown) is mounted in a hub 1420 and a wheel 1418 it rotatable mounted on the axle. When the actuator 1416 is actuated, it drives the driving shaft 1406 and driving gear 1406. The driving gear 1406 drives the driven gear 1410 and driven shaft 1408, thereby turning the plate 1422, the bracket 1424 and the wheel 1418 into the desired direction. The wheel 1418 may be driven by a motor 1426, depending on the configuration of the MPMS in which the single wheel maneuvering unit 1400 is installed.

Figure 15A:
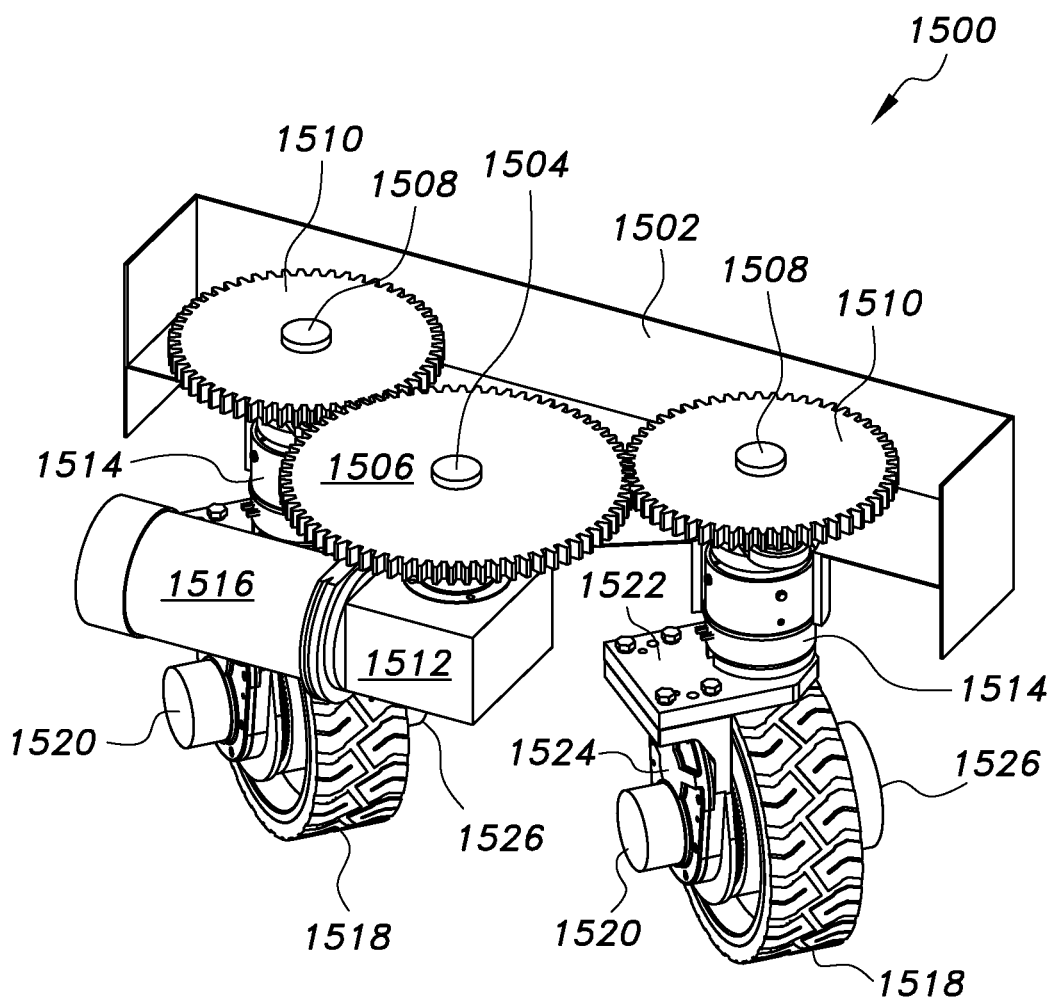
FIG. 15A is a first perspective view of a first embodiment of a parallel maneuvering unit.
Figure 15B:
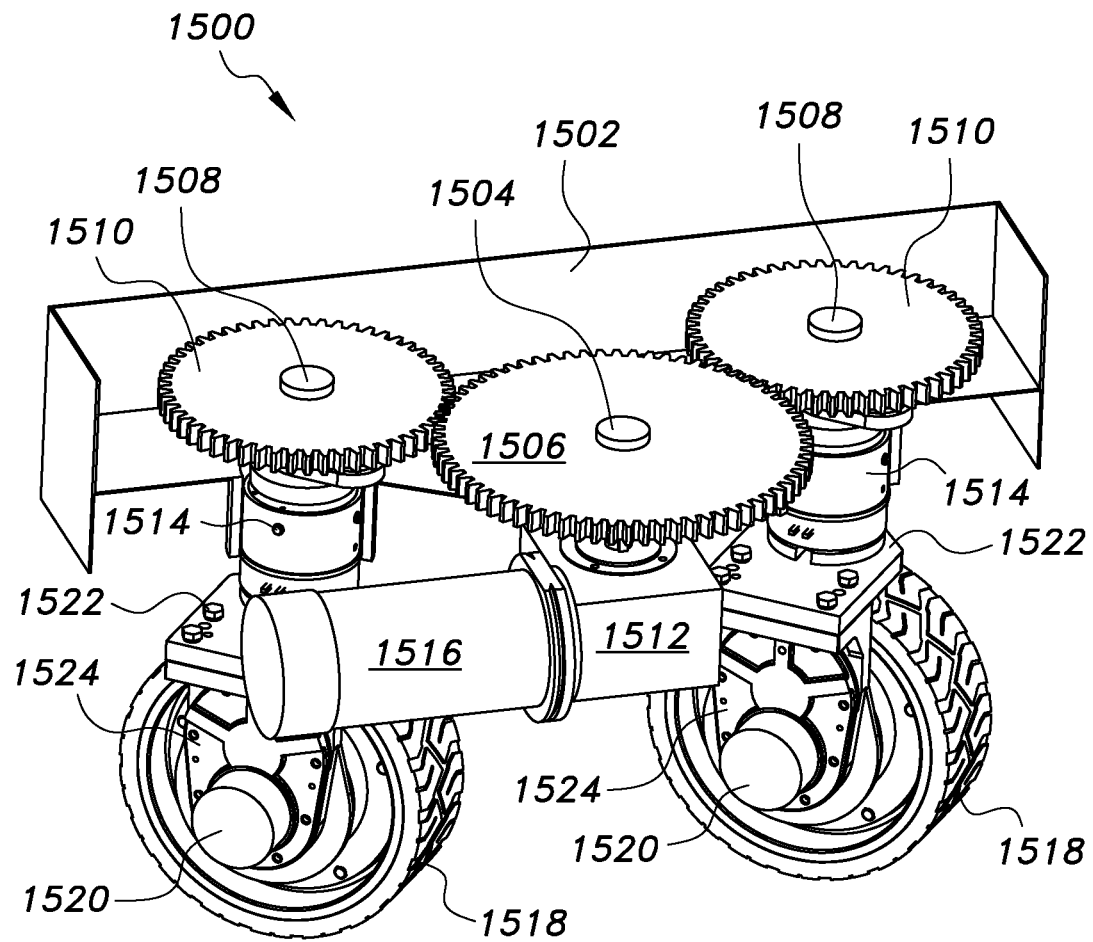
FIG. 15B is a second perspective view of the parallel maneuvering unit of FIG. 15A.

FIGS. 15A-B show the details of the steering mechanism of a first embodiment of a two-wheel PMU 1500. The PMU 1500 includes a frame 1502 which may be part of the PMU's chassis. A driving shaft 1504 has a driving gear 1506 mounted on its top end. Two driven shafts 1508 have driven gears 1510 mounted on its top end. The driving shaft 1504 is driven by a steering actuator 1516 via a 90-degree gear box 1512. The driven shafts 1508 extend through steering yokes 1514 and are connected to one end of horizontal plates 1522. Downwardly extending brackets 1524 are attached to the opposite end of the horizontal plate 1522. Axles (not shown) are mounted in hubs 1520 and wheels 1518 are rotatable mounted on the axles. When the actuator 1516 is actuated, it drives the driving shaft 1506 and driving gear 1506. The driving gear 1506 drives the driven gears 1510 and driven shafts 1508, thereby turning the plates 1522, the bracket 1524 and the wheel 1518 into the desired direction. One or both of the wheels 1518 may be driven by a motor 1526, depending on the configuration of the MPMS in which the PMU 1500 is installed. It should be noted that while the PMU 1500 is shown with two wheels 1518, three or more wheels with corresponding hardware may be added, limited only by space constraints. Regardless of the number of wheels 1518, the steering mechanism maintains all the wheels parallel to one another.

Figure 16A:
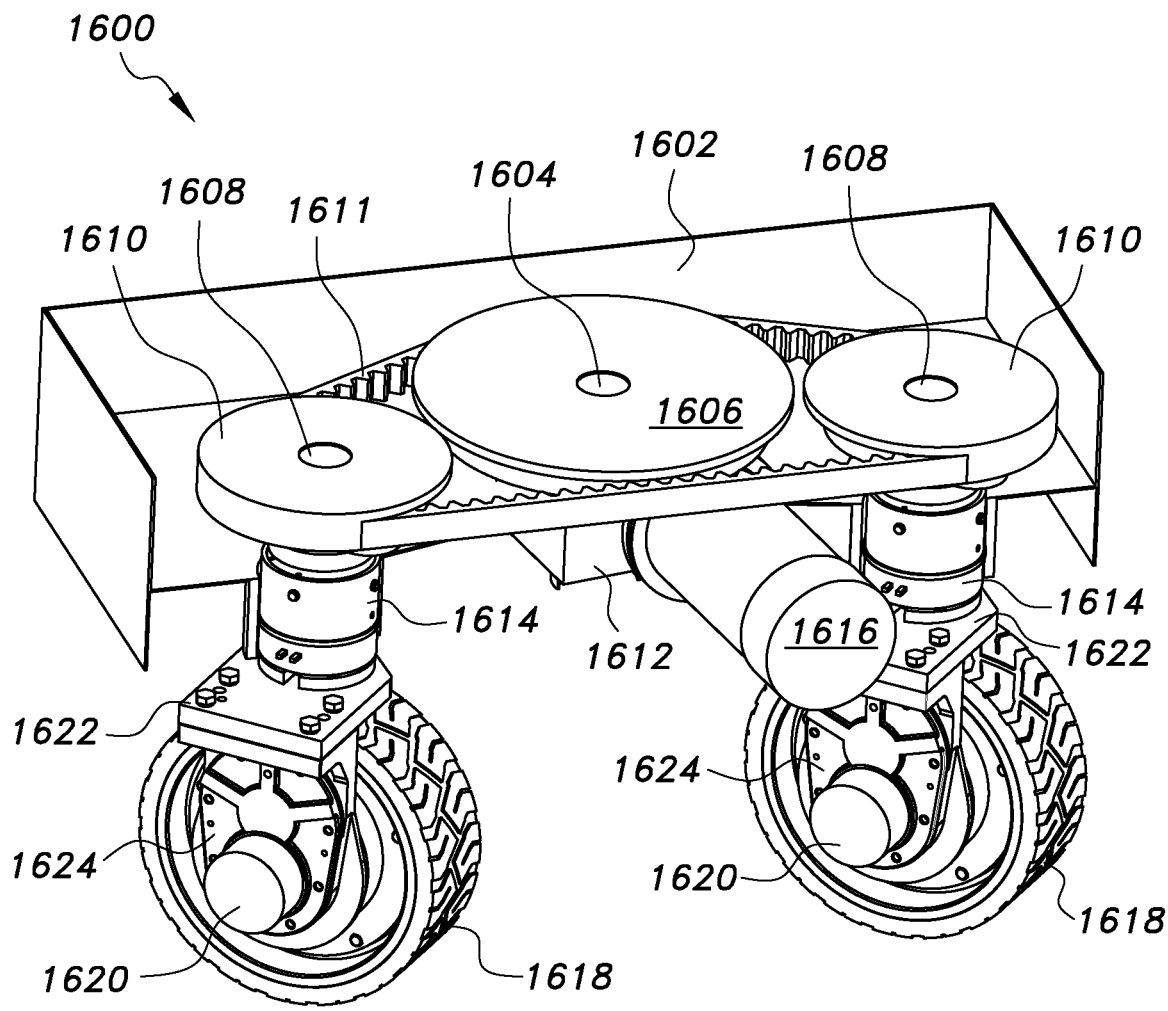
FIG. 16A is a first perspective view of a second embodiment of a parallel maneuvering unit.
Figure 16B:
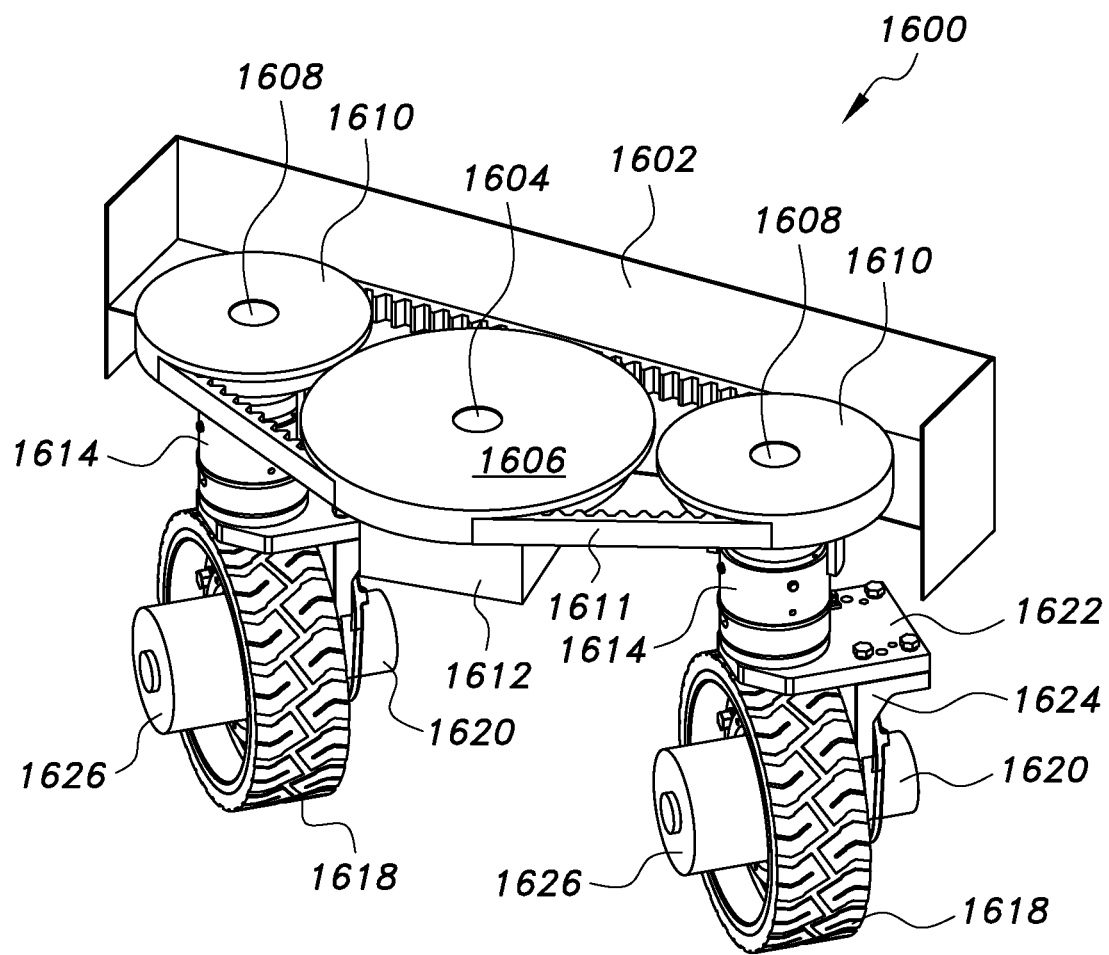
FIG. 16B is a second perspective view of the parallel maneuvering unit of FIG. 16A.

FIGS. 16A-B show the details of the steering mechanism of a second embodiment of a two-wheel PMU 1600. The PMU 1600 includes a frame 1602 which may be part of the PMU's chassis. A driving shaft 1404 has a driving pulley or sprocket 1606 mounted on its top end. Two driven shafts 1608 have driven pulleys or sprockets 1610 mounted on their top end. A chain or belt 1611 extends around the driving pulley or sprocket 1606 and the driven pulleys or sprockets 1610, for operationally connecting them. The driving shaft 1604 is driven by a steering actuator 1616 via a 90-degree gear box 1612. The driven shafts 1608 extend through steering yokes 1614 and are connected to one end of horizontal plates 1622. Downwardly extending brackets 1624 are attached to the opposite ends of the horizontal plates 1622. Axles (not shown) are mounted in hubs 1620 and wheels 1618 are rotatable mounted on the axles. When the actuator 1616 is actuated, it drives the driving shaft 1606 and driving pulley or sprocket 1606. The driving pulley or sprocket 1606 drives the chain or belt 1611, the driven pulleys or sprockets 1610, and driven shafts 1608, thereby turning the plates 1622, the bracket 1624 and the wheels 1618 into the desired direction. It should be noted that this embodiment covers both belt and pulley systems and chain and sprocket systems. One or both of the wheels 1618 may be driven by a motor 1626, depending on the configuration of the MPMS in which the PMU 1600 is installed. It should be noted that while the PMU 1600 is shown with two wheels 1618, three or more wheels with corresponding hardware may be added, limited only by space constraints. Regardless of the number of wheels 1618, the steering mechanism maintains all the wheels parallel to one another.

Figure 17A:
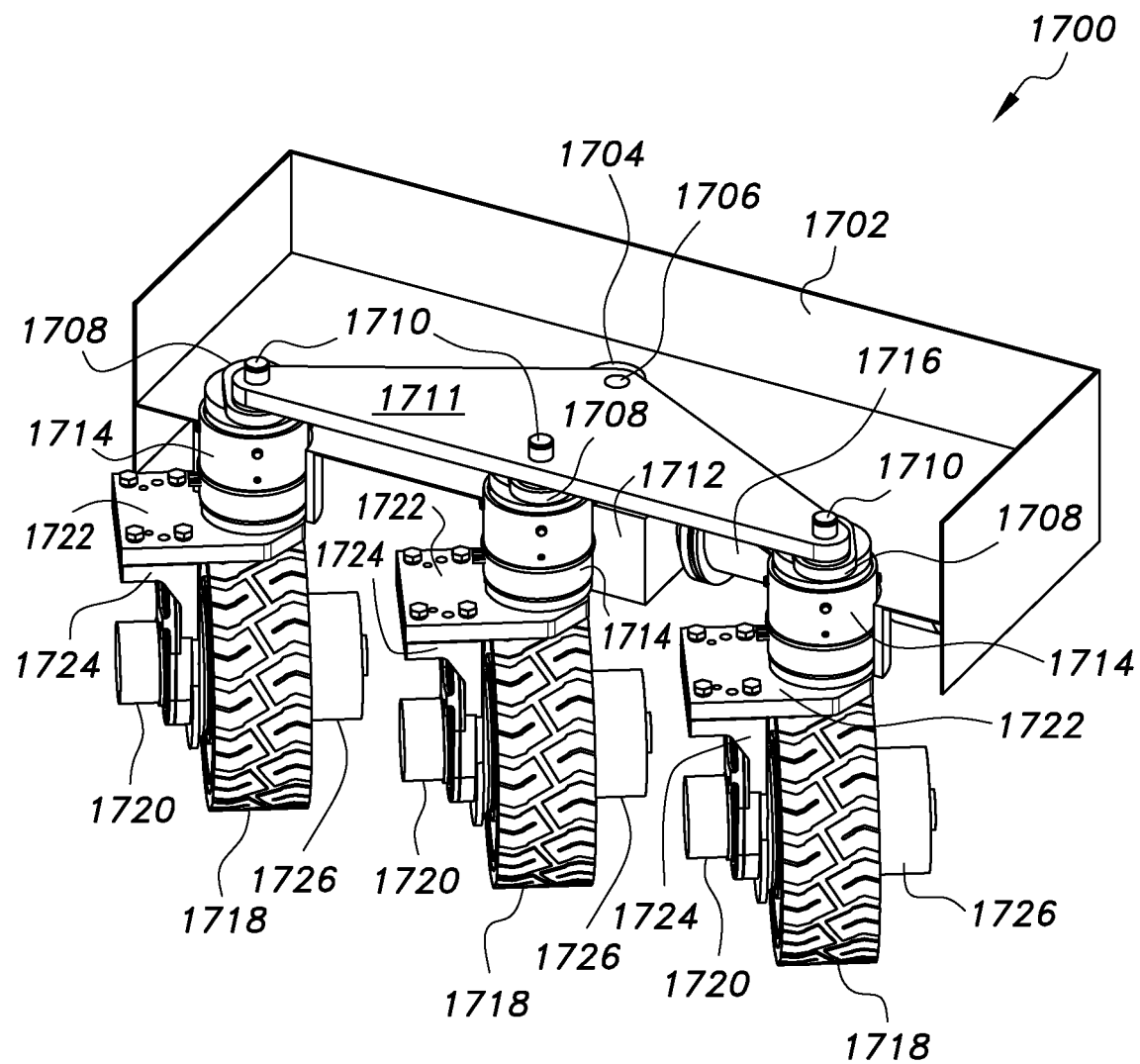
FIG. 17A is a first perspective view of a third embodiment of a parallel maneuvering unit.
Figure 17B:
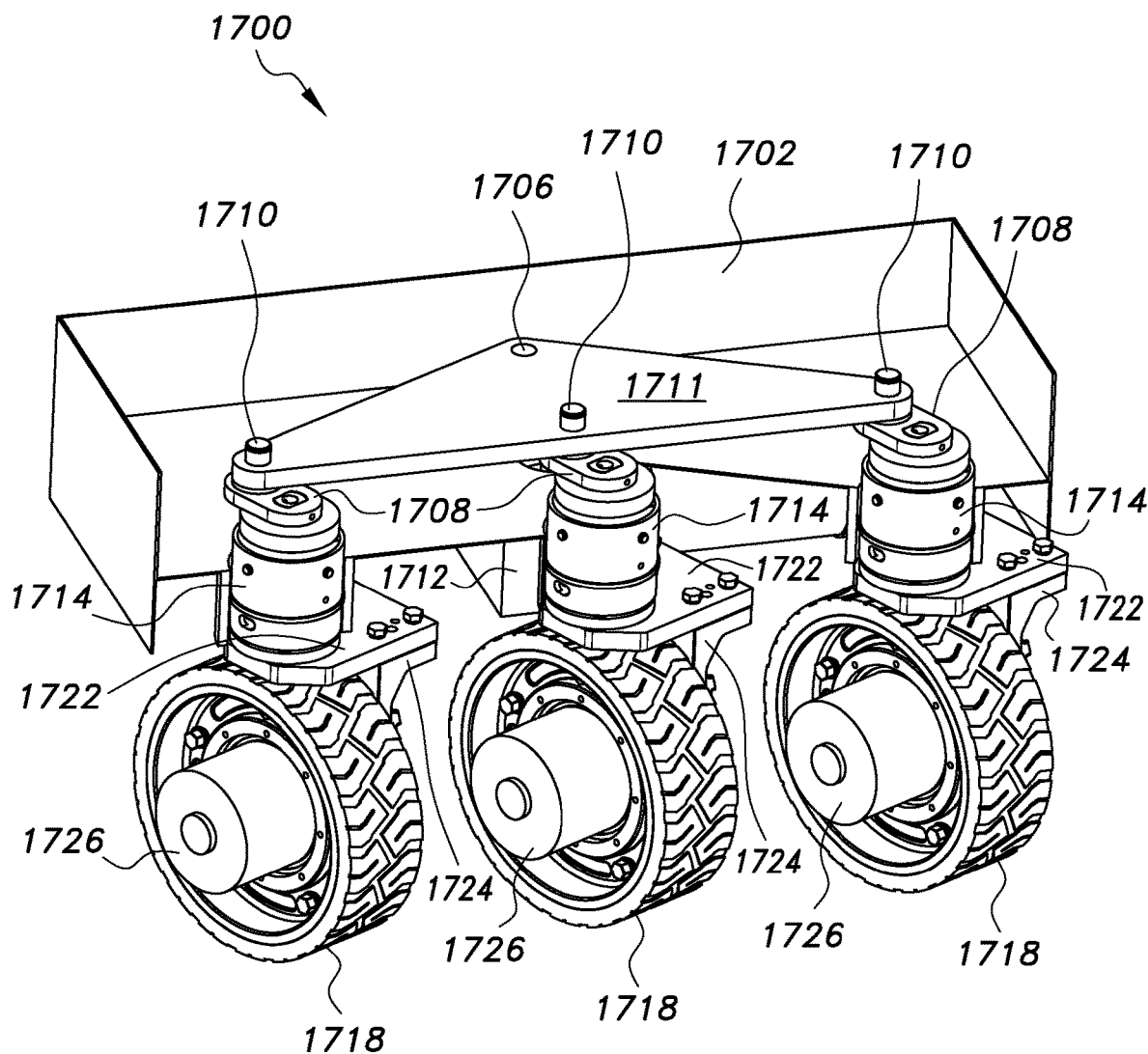
FIG. 17B is a second perspective view of the parallel maneuvering unit of FIG. 17A.

FIGS. 17A-B show the details of the steering mechanism of a third embodiment of a two-wheel PMU 1700. The PMU 1700 includes a frame 1702 which may be part of the PMU's chassis. A driving crank 1704 has a driving pin 1706 mounted on one end of its top surface. Two driven cranks 1708 have driven pins 1710 mounted on one end of their top surfaces. A rigid linkage 1711 includes three holes through which the driving pin 1706 and the driven pins 1710 extend, thereby operationally connecting the pins. The crank 1704 is driven by a steering actuator 1716 via a 90-degree gear box 1712. The driven cranks 1708 have shafts (not shown) on their ends opposite the driven pins 1710. The shafts extend through steering yokes 1714 and are connected to one end of horizontal plates 1722. Downwardly extending brackets 1724 are attached to the opposite ends of the horizontal plates 1722. Axles (not shown) are mounted in hubs 1720 and wheels 1718 are rotatable mounted on the axles. When the actuator 1716 is actuated, it drives the driving crank 1706 and the driving pin 1706. The driving pin 1706 drives the rigid linkage 1711, the driven pins 1710, and their respective cranks 1708, thereby turning the plates 1722, the bracket 1724 and the wheels 1718 into the desired direction. One or both of the wheels 1718 may be driven by a motor 1726, depending on the configuration of the MPMS in which the PMU 1700 is installed. It should be noted that while the PMU 1700 is shown with two wheels 1718, three or more wheels with corresponding hardware may be added, limited only by space constraints. Regardless of the number of wheels 1718, the steering mechanism maintains all the wheels parallel to one another.

Figure 18A:
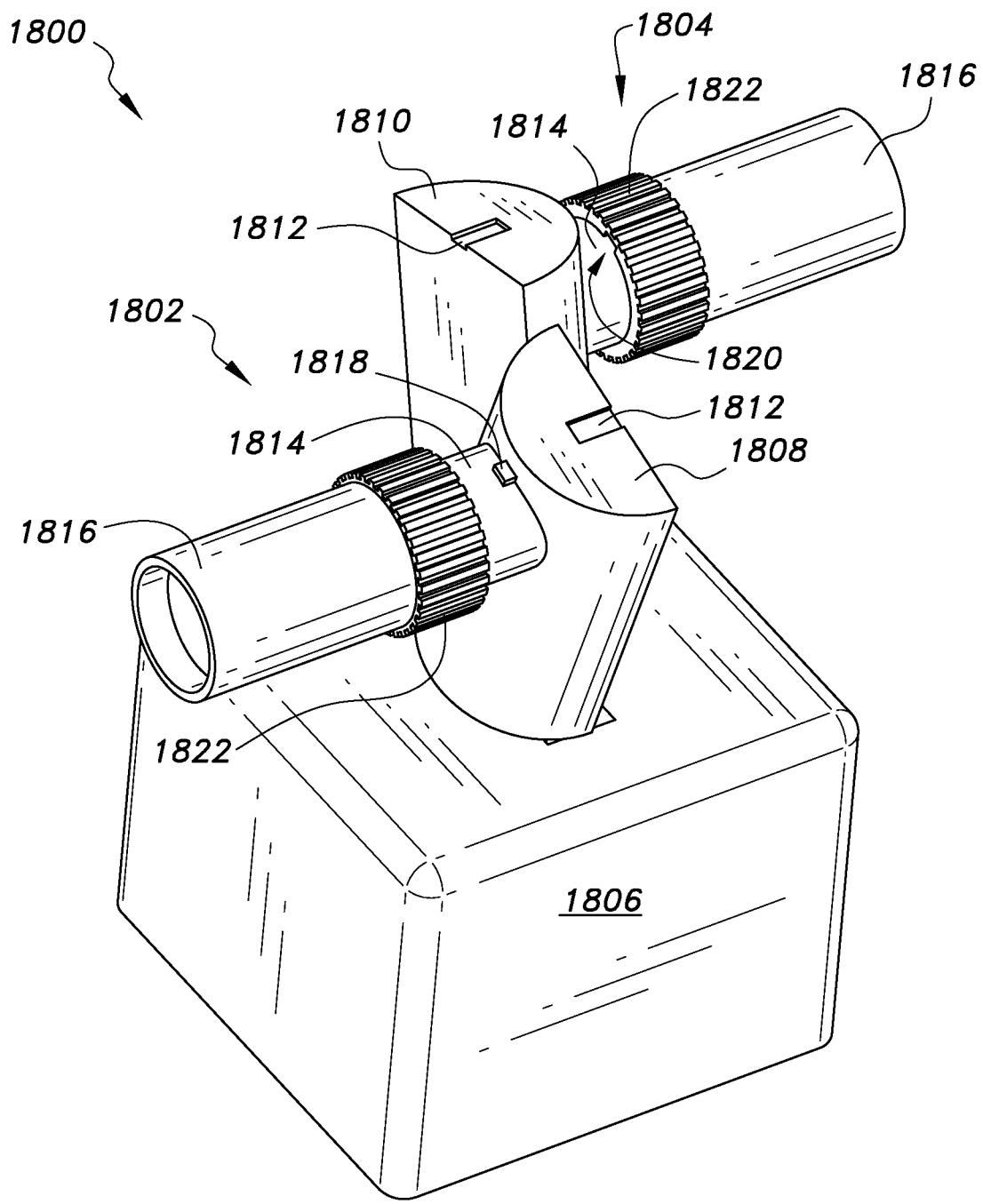
FIG. 18A is a first perspective view of a joystick controller for the multiple maneuvering system for various applications.
Figure 18B:
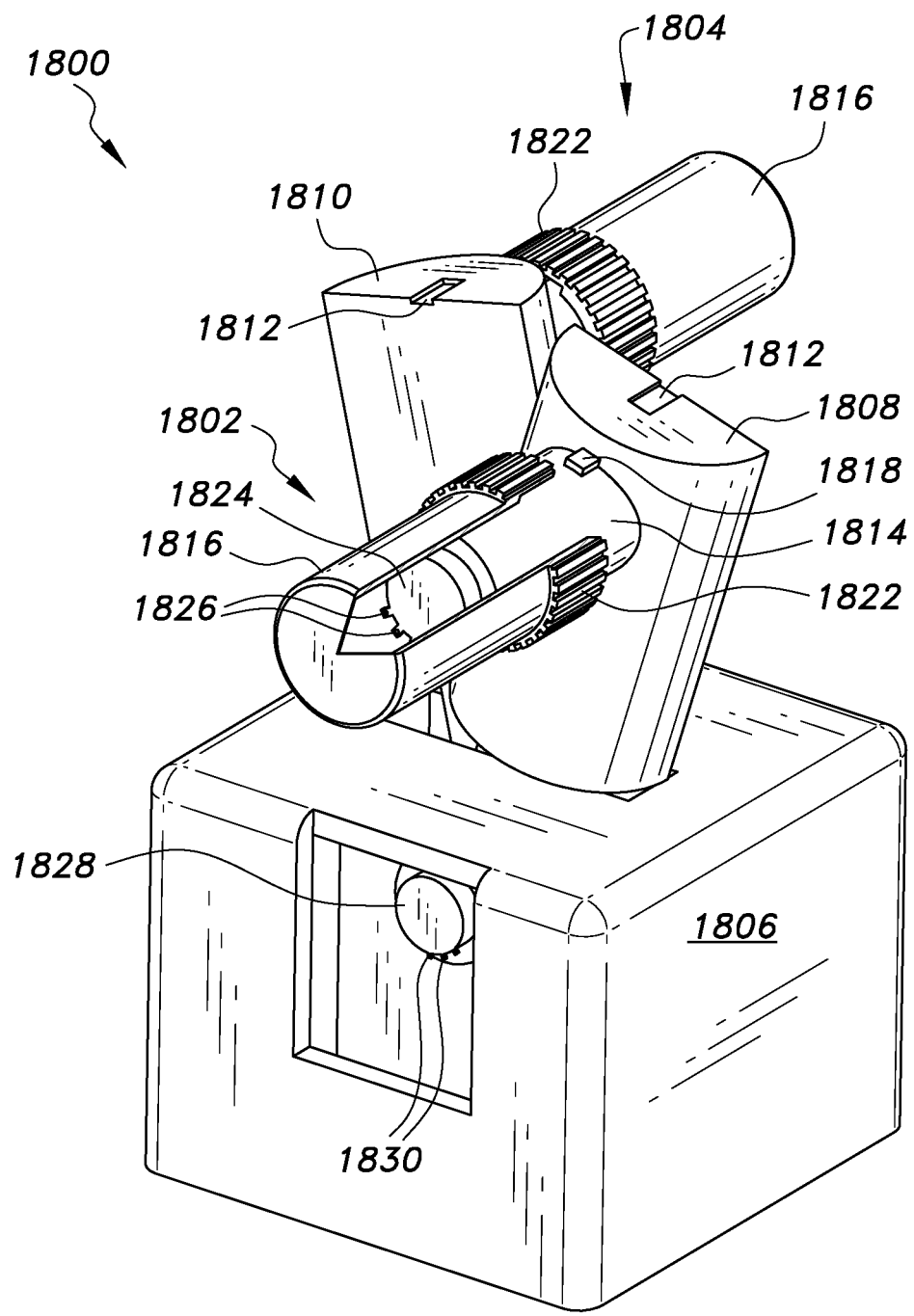
FIG. 18B is a second perspective view of the joystick controller of FIG. 18A, with portions removed to view internal components of the controller.

FIGS. 18A-B show a control actuator in the form of a dual joystick controller 1800. The dual joystick controller 1800 is configured to control an MPMS with two independent PMUs, such as MPMSs 100, 600. Two of the controllers 1800 may be used to control an MPMS with four independent PMUs, such as MPMSs 700, 1200. Other types of controllers, both joystick-types and others may be used controlling the steering and driving of the wheels.

The dual joystick controller 1800 includes two controllers 1802, 1804 one for each PMU to be controlled. A housing 1806 includes an opening on its top surface, through which a first joystick 1808 and a second joystick 1810 extend. The joysticks 1808, 1810 control the speed of the powered wheels of their respective PMU and are in the form of half cylinders such that they can rotate independently without interfering with one another. A first joystick angular transducer 1828 produces a signal indicative of the angular position of the first joystick 1808, and a second joystick angular transducer (not shown) produces a signal indicative of the angular position of the second joystick 1810. The signal is provided to electrical contacts 1830. Pushing the joysticks 1808, 1810 forward activates the wheels to move in a forward direction, while pulling the joysticks 1808, 1810 backward activates the wheels to move in a reverse direction. The amount the joysticks 1808, 1810 are pushed or pulled determines the speed of the wheels. For example, as shown in FIGS. 18A-B, joystick 1808 is shown in its maximum reverse position, while joystick 1810 is shown in its maximum forward position. The top of each joystick 1808, 1810 includes an angular scale indicator 1812 for displaying the angle of inclination of the joystick. In addition, angular scale indicators 1812 may assist in aligning the joysticks, for driving all wheels of the MPMS at the same speed. When the joysticks 1808, 1810 are directly upright or normal to the top of the housing 1806, the wheels are not driven.

The joysticks 1808, 1810 include horizontal cylindrical rods 1814 attached to, or integral with, and extending perpendicular to the rounded surfaces of the joysticks 1808, 1810. The horizontal rods 1814 have cylindrical steering sleeves 1816 rotatable mounted on them. The steering sleeves 1816 may include knurled or grooved surfaces 1822 on their inner ends, to provide greater friction for the operator. Sleeve angular transducers 1824 mounted on the distal ends of the horizontal rods 1814 produce signals indicative of the angular position of the steering sleeves 1816 relative to their respective horizontal rod 1814. The signals are provided to electrical contacts 1826. Each of the horizontal rods 1814 also includes a locking knob or raised surface 1818 on the top of its cylindrical surface and adjacent to their respective joystick 1808, 1810. Each of the steering sleeves 1816 include a locking recess 1820 in their interior surface adjacent to their inner ends. To steer the wheels of the respective PMUs, an operator twists the steering sleeves 1816 relative to the horizontal rods 1814 in a first direction for steering left and a second opposite direction for steering right. When the locking recess 1820 is aligned with the locking knob 1818, the wheels of the associated PMU are steered in a longitudinal direction of the MPMS as described below with respect to FIGS. 20A-E. As shown, both steering sleeves 1816 are in their active mode and can control the steering of the wheels of their associated PMU. When an operator slides a steering sleeve 1816 inwardly, such that the locking knob 1818 is received in locking recess 1820, the steering sleeve 1816 is in its inactive mode and cannot be rotated relative to its respective horizontal rods 1814, and the wheels of their associated PMU are maintained in a longitudinal direction of the MPMS.

Figure 19:
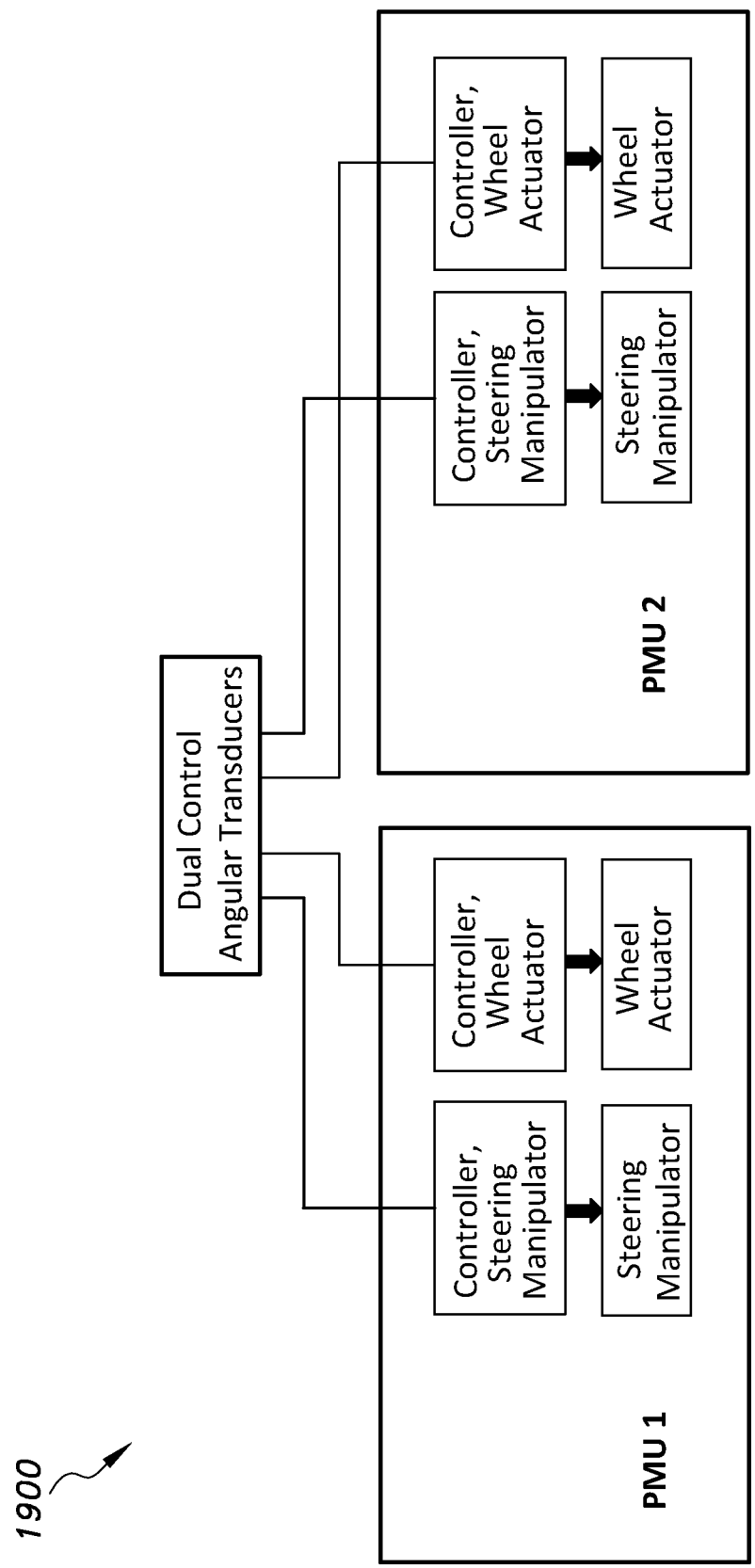
FIG. 19 is a block diagram of an electrical control system for the multiple maneuvering system for various applications.

FIG. 19 is a block diagram of an electrical control system for a two-PMU MPMS for various applications. In this example, a dual controller, such as the dual controller 1800 shown in FIGS. 18A-B and described above, is used to control two PMUs (PMU1 and PMU2). The signal from the sleeve angular transducer 1824 of controller 1802 is sent to the steering manipulator controller of PMU1, while the signal from the sleeve angular transducer 1824 of controller 1804 is sent to the steering manipulator controller of PMU2. The steering manipulator controllers control their respective steering manipulator (for example, steering actuators 1516, 1616, 1716) to steer the wheels of their respective PMU in the desired direction. The signal from the joystick angular transducer 1828 of controller 1802 is sent to the wheel actuator controller of PMU1, while the signal from the joystick angular transducer 1828 of controller 1804 is sent to the wheel actuator controller of PMU2. The wheel actuator controllers control their respective wheel actuators (for example, motors 614, 726, 1526, 1626, 1726) to drive the wheels of their respective PMU in the desired direction and at the desired speed.

FIGS. 20A-20E are diagrams showing various steering configurations of an MPMS 2000 having a three-wheel PMU 2002 and a two-wheel PMU 2004 connected by a connecting structure 2006. In the diagrams, the wheels 2008 of PMU 2002 are steered at a first angle $\alpha_1$ relative to the longitudinal axis of the MPMS 2000, and the wheels 2008 of PMU 2002 are steered at a second angle $\alpha_2$ relative to the longitudinal axis of the MPMS 2000.

In FIG. 20A, $\alpha_1 = \alpha_2 \neq 0°$, such that all the wheels 2008, 2010 are parallel to one another and steered in a diagonal direction relative to the longitudinal axis of the MPMS 2000. Using the dual joystick controller 1800, the cylindrical steering sleeves 1816 of both controllers 1802, 1804 are active (the locking knobs 1818 are out of the locking recesses 1820) and are rotated in the same direction and the same amount.

In FIG. 20B, $\alpha_1 = \alpha_2 = 0°$, such that all the wheels 2008, 2010 are parallel to one another and steered in a direction parallel to the longitudinal axis of the MPMS 2000. Using the dual joystick controller 1800, the cylindrical steering sleeves 1816 of both controllers 1802, 1804 are rotated such that the locking knobs 1818 are aligned with the locking recesses 1820. The steering sleeves 1816 may be slid outward and active (the locking knobs 1818 being out of the locking recesses 1820) or slid inward and inactive (the locking knobs 1818 being within the locking recesses 1820).

In FIG. 20C, $\alpha_1 = 0°$, $\alpha_2 \neq 0°$ such that the wheels 2008 are steered in a direction parallel to the longitudinal axis of the MPMS 2000, and wheels 2010 are steered in a diagonal direction relative to the longitudinal axis of the MPMS 2000. Using the dual joystick controller 1800, the cylindrical steering sleeve 1816 of the controller 1802 is rotated such that its locking knob 1818 is aligned with the locking recesses 1820. The cylindrical steering sleeve 1816 of the controller 1804 is rotated such that its locking knob 1818 is not aligned with the locking recesses 1820. To operate MPMS 2000 in a conventional motor vehicle configuration, the steering sleeve 1816 of the controller 1802 is slid inward and inactive with its locking knob 1818 being within the locking recess 1820, thereby maintaining wheels 2008 in a conventional stationary parallel rear wheel configuration. The cylindrical steering sleeve 1816 of the controller 1804 is slid outward and active, thereby allowing wheels 2010 to be steered in a conventional parallel steered front wheel configuration.

In FIG. 20D, $\alpha_1 \neq \alpha_2 \neq 0°$, such that the wheels 2008 are steered in a first diagonal direction relative to the longitudinal axis of the MPMS 2000 and the wheels 2010 are steered in a second, different diagonal direction relative to the longitudinal axis of the MPMS 2000 (adjustable steering). In the specific relative position shown $\alpha_1 = -\alpha_2$, such that wheels 2008, 2010 are steered in the same angle relative to the longitudinal axis of the MPMS 2000, but in opposite directions (four-wheel steering). Using the dual joystick controller 1800, the cylindrical steering sleeves 1816 of both controllers 1802, 1804 are active (the locking knobs 1818 are out of the locking recesses 1820) and are rotated the same amount, but in opposite directions.

In FIG. 20E, $\alpha_1 = \alpha_2 = 90°$, such that the wheels 2008, 2010 are all steered in a direction perpendicular to the longitudinal axis of the MPMS 2000 (lateral steering). This position is particularly useful for parking a motor vehicle laterally between two obstacles. Using the dual joystick controller 1800, the cylindrical steering sleeves 1816 of both controllers 1802, 1804 are active (the locking knobs 1818 are out of the locking recesses 1820) and are rotated to their maximum and in the same direction.

It is to be understood that the multiple maneuvering systems for various applications are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A multiple maneuvering system for various applications, comprising:
    at least two maneuvering units, the at least two maneuvering units comprising a first maneuvering unit, and a second maneuvering unit, the second maneuvering unit being a parallel maneuvering unit, the first maneuvering unit comprising:
    a first chassis;
    at least two wheels, the at least two wheels comprising a first wheel, the first wheel having a first horizontal rolling axis and being rotatably attached to the first chassis around a first vertical steering axis;
    a first independent steering mechanism for rotating the first wheel about the first vertical steering axis relative to the first chassis into a first steering direction; and
    the second maneuvering unit comprising:
    a second chassis;
    at least two wheels, the at least two wheels comprising a second wheel and a third wheel, the second wheel having a second horizontal rolling axis and being rotatably attached to the second chassis around a second vertical steering axis;
    the third wheel having a third horizontal rolling axis and being rotatably attached to the second chassis around a third vertical steering axis;
    a second independent steering mechanism for rotating the second and third wheels about their vertical steering axes relative to the second chassis into a second steering direction, the second steering mechanism maintaining the second and third wheels parallel to one another; and a first adjustable connecting structure for connecting the first chassis to the second chassis, such that the second chassis can move relative to the first chassis.

2. The multiple maneuvering system for various applications as recited in claim 1, wherein:
the multiple maneuvering system is a multiple parallel maneuvering system;
the first maneuvering unit is a parallel maneuvering unit and further comprises at least two wheels, the at least two wheels comprising the first wheel and a fourth wheel, the fourth wheel having a fourth horizontal rolling axis and being rotatably attached to the first chassis around a fourth vertical steering axis; and
the first independent steering mechanism rotates the first and fourth wheels about their vertical steering axes relative to the first chassis into the first steering direction, the first steering mechanism maintaining the first and fourth wheels parallel to one another.

3. The multiple parallel maneuvering system for various applications as recited in claim 2, further comprising:
a first motor for driving at least one of the first and fourth wheels about their rolling axis; and
a second motor for driving at least one of the second and third wheels about their rolling axis.

4. The multiple parallel maneuvering system for various applications as recited in claim 2, wherein the first and second steering mechanisms are chosen from the group consisting essentially of coupling gears, belt and pulley, chain and sprocket and rigid linkage.

5. The multiple parallel maneuvering system for various applications as recited in claim 2, further comprising a load support panel connected to an upper portion of the multiple parallel maneuvering system by a joint, the joint allowing rotation of the load support panel relative to the upper portion of the multiple parallel maneuvering system.

6. The multiple maneuvering system for various applications as recited in claim 1, wherein the second chassis is moved relative to the first chassis by driving the first wheel in a first driving direction and driving the second and third wheels in a second driving direction, the first driving direction being in a different direction than the second driving direction.

7. The multiple parallel maneuvering system for various applications as recited in claim 2, wherein the first adjustable connecting structure for connecting the first chassis to the second chassis is a linearly adjustable structure, such that the first chassis and the second chassis can be extended or retracted from one another.

8. The multiple parallel maneuvering system for various applications as recited in claim 7, wherein the first adjustable connecting structure comprises a telescoping mechanism.

9. The multiple parallel maneuvering system for various applications as recited in claim 8, further comprising:
a third maneuvering unit, the third maneuvering unit being a parallel maneuvering unit and comprising:
a third chassis;
a fifth wheel having a fifth horizontal rolling axis and being rotatably attached to the third chassis around a fifth vertical steering axis;
a sixth wheel having a sixth horizontal rolling axis and being rotatably attached to the third chassis around a sixth vertical steering axis;
a third steering mechanism for rotating the fifth and sixth wheels about their vertical steering axes relative to the third chassis into a third steering direction, the third steering mechanism maintaining the fifth and sixth wheels parallel to one another;

a fourth maneuvering unit, the fourth maneuvering unit being a parallel maneuvering unit and comprising:
a fourth chassis;
a seventh wheel having a seventh horizontal rolling axis and being rotatably attached to the fourth chassis around a seventh vertical steering axis;
an eighth wheel having an eighth horizontal rolling axis and being rotatably attached to the fourth chassis around an eighth vertical steering axis;
a fourth steering mechanism for rotating the seventh and eighth wheels about their vertical steering axes relative to the fourth chassis into a fourth steering direction, the fourth steering mechanism maintaining the seventh and eighth wheels parallel to one another;
a second connecting structure for connecting the first chassis to the second chassis, the second connecting structure being a linearly adjustable structure, such that the third chassis and the fourth chassis can be extended or retracted from one another; and
a third connecting structure for rotatably connecting the first connecting structure to the second connecting structure.

10. The multiple parallel maneuvering system for various applications as recited in claim 9, wherein the third connecting structure comprises a brake for locking rotation of the first connecting structure relative to the second connecting structure.

11. The multiple parallel maneuvering system for various applications as recited in claim 8, further comprising a detachable safety leg assembly, the detachable safety leg assembly comprising:
a horizontal bar having a distal end and a proximate end, the proximate end of the horizontal bar being rotatable attached to one of the first or second chassis;
a vertical post with an upper end and a lower end, the upper end of the vertical post being attached to and extending downward from the distal end of the horizontal bar;
a caster wheel rotatably attached to the lower end of the vertical post; and
a safety leg extension and retraction mechanism, the safety leg extension and retraction mechanism rotating the horizontal bar away from the one of the first or second chassis as the first chassis is moved away from the second chassis and rotating the horizontal bar toward the one of the first or second chassis as the first chassis is moved toward the second chassis.

12. The multiple parallel maneuvering system for various applications as recited in claim 8, wherein the telescoping mechanism further comprises a locking mechanism for locking the telescoping mechanism to a desired length.

13. The multiple parallel maneuvering system for various applications as recited in claim 7, wherein the first connecting structure comprises a scissor mechanism.

14. The multiple parallel maneuvering system for various applications as recited in claim 2, wherein the first adjustable connecting structure for connecting the first chassis to the second chassis is a rotationally adjustable structure, such that the first chassis and the second chassis can be rotated relative to one another.

15. A multiple parallel maneuvering system for various applications, comprising:
at least two maneuvering units, the at least two maneuvering units comprising a first parallel maneuvering unit, and a second parallel maneuvering unit, the first parallel maneuvering unit comprising:

a first chassis;
at least two wheels, the at least two wheels comprising a first wheel and a second wheel, the first wheel having a first horizontal rolling axis and being rotatably attached to the first chassis around a first vertical steering axis, the second wheel having a second horizontal rolling axis and being rotatably attached to the first chassis around a second vertical steering axis; and
a first independent steering mechanism for rotating the first and second wheels about their vertical steering axes relative to the first chassis into a first steering direction, the first independent steering mechanism maintaining the first and second wheels parallel to one another;

the second maneuvering unit comprising:
a second chassis;
at least two wheels, the at least two wheels comprising a third wheel and a fourth wheel, the third wheel having a third horizontal rolling axis and being rotatably attached to the second chassis around a third vertical steering axis, the fourth wheel having a fourth horizontal rolling axis and being rotatably attached to the second chassis around a fourth vertical steering axis; and
a second independent steering mechanism for rotating the third and fourth wheels about their vertical steering axes relative to the second chassis into a second steering direction, the second steering mechanism maintaining the third and fourth wheels parallel to one another;

a first connecting structure for connecting the first chassis to the second chassis; and
a steering actuator with a first control means and a second control means, and wherein:
the first control means has a first active mode and a first inactive mode;
in the first active mode, the first control means controls the first steering mechanism to rotate the first and fourth wheels about their respective vertical steering axes;
in the first inactive mode, the first control means does not control the first steering mechanism and the first and fourth wheels are maintained in the first direction;
the second control means has a second active mode and a second inactive mode;
in the second active mode, the second control means controls the second steering mechanism to rotate the second and third wheels about their respective vertical steering axes;
in the second inactive mode, the second control means does not control the second steering mechanism and the second and third wheels are maintained in the second direction.

16. The multiple parallel maneuvering system for various applications as recited in claim 15, wherein:
when the first control means is in the first active mode the first and fourth wheels can be controlled to rotate to a direction not parallel ($\alpha \neq 0$) to a longitudinal direction of the multiple parallel maneuvering system; and when the second control means is in the second inactive mode the second and third wheels are maintained in a direction parallel ($\alpha = 0$) to the longitudinal direction of the multiple parallel maneuvering system.

17. The multiple parallel maneuvering system for various applications as recited in claim 15, wherein:
the first control means comprises a first angular transducer; and
the second control means comprises a second angular transducer.

18. A four-wheel vehicle, comprising:
at least two parallel maneuvering units, the at least two parallel maneuvering units comprising a first parallel maneuvering unit, and a second parallel maneuvering unit, the first maneuvering unit comprising:
a first chassis;
at least two wheels, the at least two wheels comprising a first wheel and a second wheel, the first wheel having a first horizontal rolling axis and being rotatably attached to the first chassis around a first vertical steering axis;
the second wheel having a second horizontal rolling axis and being rotatably attached to the first chassis around a second vertical steering axis;
a first steering mechanism for rotating the first and second wheels about their respective vertical steering axes relative to the first chassis into a first steering direction, the first steering mechanism maintaining the first and second wheels parallel to one another;

the second maneuvering unit comprising:
a second chassis;
at least two wheels, the at least two wheels comprising a third wheel and a fourth wheel, the third wheel having a third horizontal rolling axis and being rotatably attached to the second chassis around a third vertical steering axis;
the fourth wheel having a fourth horizontal rolling axis and being rotatably attached to the second chassis around a fourth vertical steering axis; and
a second steering mechanism for rotating the third and fourth wheels about their vertical steering axes relative to the second chassis into a second steering direction, the second steering mechanism maintaining the third and fourth wheels parallel to one another; and
an adjustable connecting structure for connecting the first chassis to the second chassis, such that the second chassis can move relative to the first chassis.

19. The four-wheel vehicle as recited in claim 18, wherein:
the first and second steering mechanisms have active and inactive modes; and
in a first steering configuration, the first steering mechanism is maintained in active mode and the second steering mechanism is maintained in inactive mode.

20. The multiple parallel maneuvering system for various applications as recited in claim 19, wherein in a second steering configuration, the first and second steering mechanisms are both maintained in active mode.

* * * * *